(12) United States Patent
Nayak et al.

(10) Patent No.: US 11,989,458 B2
(45) Date of Patent: May 21, 2024

(54) SPLITTING SEQUENTIAL READ COMMANDS

(71) Applicant: Western Digital Technologies, Inc., San Jose, CA (US)

(72) Inventors: Dattatreya B Nayak, Udupi (IN); Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 9 days.

(21) Appl. No.: 17/942,452

(22) Filed: Sep. 12, 2022

(65) Prior Publication Data
US 2024/0086107 A1    Mar. 14, 2024

(51) Int. Cl.
*G06F 3/06* (2006.01)
(52) U.S. Cl.
CPC .......... *G06F 3/0659* (2013.01); *G06F 3/0604* (2013.01); *G06F 3/0634* (2013.01); *G06F 3/0679* (2013.01)
(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768;
(Continued)

(56) References Cited

U.S. PATENT DOCUMENTS 8,310,880 B2 * 11/2012 Kuehne ................ G06F 3/0679
 365/189.04
8,595,411 B2    11/2013 Selinger et al.
(Continued)

OTHER PUBLICATIONS

Efficient flash memory read request handling based on split transactions; Kim et al.; Proc. International Workshop on Software Support for Portable Storage; 2009; retrieved from https://cseweb.ucsd.edu/~brk006/pdfs/iwssps09_transactions.pdf on Nov. 16, 2023 (Year: 2009).*

(Continued)

*Primary Examiner* — Daniel C. Chappell
(74) *Attorney, Agent, or Firm* — Vierra Magen Marcus LLP

(57) ABSTRACT

Technology is disclosed herein for handling of mixed random read and sequential read command sequences. Plane read commands are formed from one or more sequential read commands. A sequential read command may be split into multiple plane read commands at plane boundaries. The plane read commands are submitted to the respective planes as asynchronous independent plane read commands. Random read commands may be submitted to the planes as asynchronous independent plane read (AIPR) commands on par with the split sequential read commands. Therefore, AIPR may be used for both sequential read commands and random read commands. Submitting a split sequential read command to one or more planes while one or more other planes are performing a random read command can significantly improve performance.

20 Claims, 15 Drawing Sheets

(58) Field of Classification Search
CPC .......... G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 9,135,192 B2* | 9/2015 | Lin | G06F 13/1626 |
| 9,330,765 B2 | 5/2016 | Kim | |
| 9,389,804 B2* | 7/2016 | Kim | G06F 3/061 |
| 9,396,775 B2* | 7/2016 | Shirakawa | G11C 16/26 |
| 9,489,141 B2* | 11/2016 | Nanduri | G06F 3/061 |
| 9,619,175 B2* | 4/2017 | Chung | G06F 3/0688 |
| 9,734,911 B2 | 8/2017 | Sinclair et al. | |
| 9,798,470 B2* | 10/2017 | Fukuda | G06F 3/064 |
| 9,799,406 B2* | 10/2017 | Sato | G11C 16/26 |
| 9,977,623 B2 | 5/2018 | Jean et al. | |
| 10,042,563 B2 | 8/2018 | Nanduri et al. | |
| 10,467,155 B2* | 11/2019 | McVay | G06F 13/4282 |
| 10,740,042 B2 | 8/2020 | Liu et al. | |
| 11,182,101 B2 | 11/2021 | Bazarsky et al. | |
| 11,314,636 B1 | 4/2022 | Kuzmin et al. | |
| 2012/0198125 A1* | 8/2012 | Post | G06F 12/0246 711/E12.008 |
| 2016/0011779 A1* | 1/2016 | Lee | G11C 16/08 711/103 |
| 2016/0283116 A1 | 9/2016 | Ramalingam | |
| 2017/0109096 A1 | 4/2017 | Jean et al. | |
| 2019/0227749 A1 | 7/2019 | Wakchaure et al. | |
| 2020/0258584 A1 | 8/2020 | Sharma et al. | |
| 2023/0140773 A1* | 5/2023 | Raju | G06F 3/064 711/154 |
| 2023/0147294 A1* | 5/2023 | Sreedhar | G06N 3/0495 711/103 |
| 2023/0153024 A1* | 5/2023 | Shridhar | G06F 3/0679 711/156 |

OTHER PUBLICATIONS

F. Chen, R. Lee and X. Zhang, "Essential roles of exploiting internal parallelism of flash memory based solid state drives in high-speed data processing," 2011 IEEE 17th International Symposium on High Performance Computer Architecture, San Antonio, TX, USA, 2011, pp. 266-277 (Year: 2011).*

Feng Chen, Binbing Hou, and Rubao Lee. 2016. Internal Parallelism of Flash Memory-Based Solid-State Drives. ACM Trans. Storage 12, 3, Article 13 (Jun. 2016), 39 pages. https://doi.org/10.1145/2818376 (Year: 2016).*

Y. Taito, V. Moschiano and S. Shiratake, "Session 30 Overview: Non-Volatile Memories," 2021 IEEE International Solid-State Circuits Conference (ISSCC), San Francisco, CA, USA, 2021, pp. 420-421, doi: 10.1109/ISSCC42613.2021.9365847. (Year: 2021).*

T. Pekny et al., "A 1-Tb Density 4b/Cell 3D-NAND Flash on 176-Tier Technology with 4-Independent Planes for Read using CMOS-Under-the-Array," 2022 IEEE International Solid-State Circuits Conference (ISSCC), San Francisco, CA, USA, 2022, pp. 1-3, doi: 10.1109/ISSCC42614.2022.9731691. (Year: 2022).*

\* cited by examiner

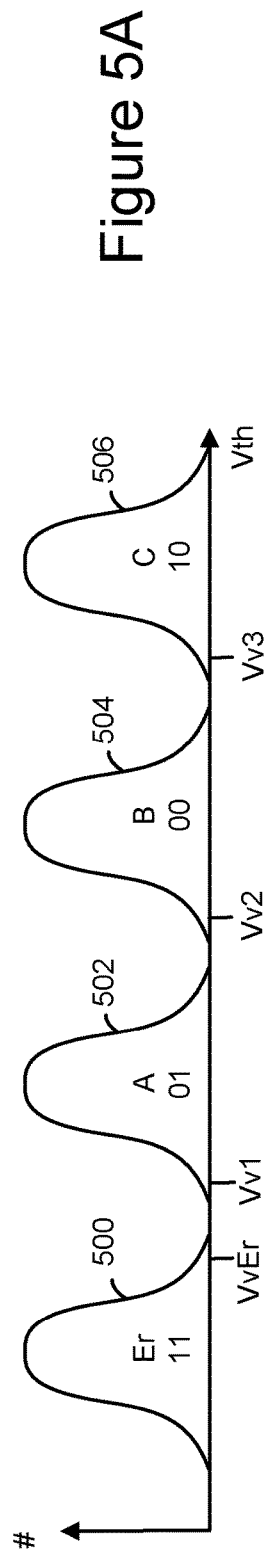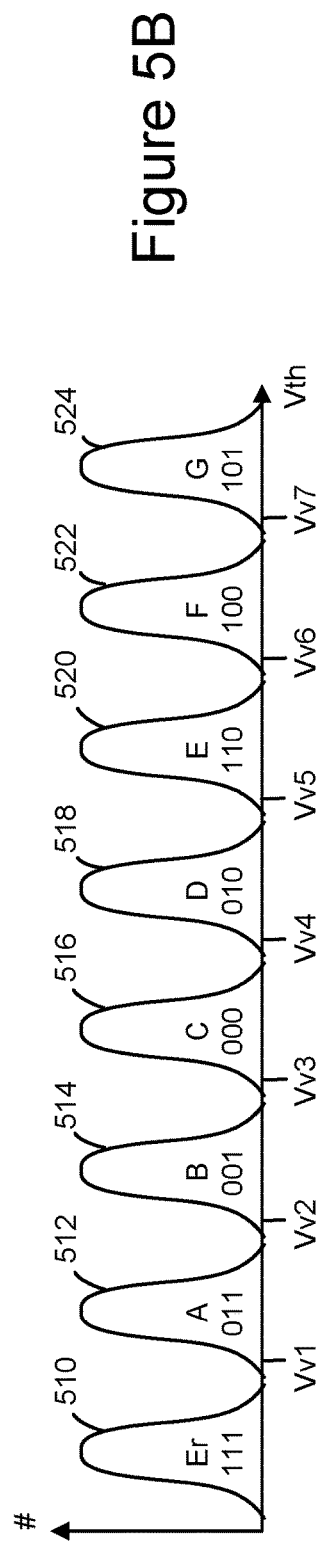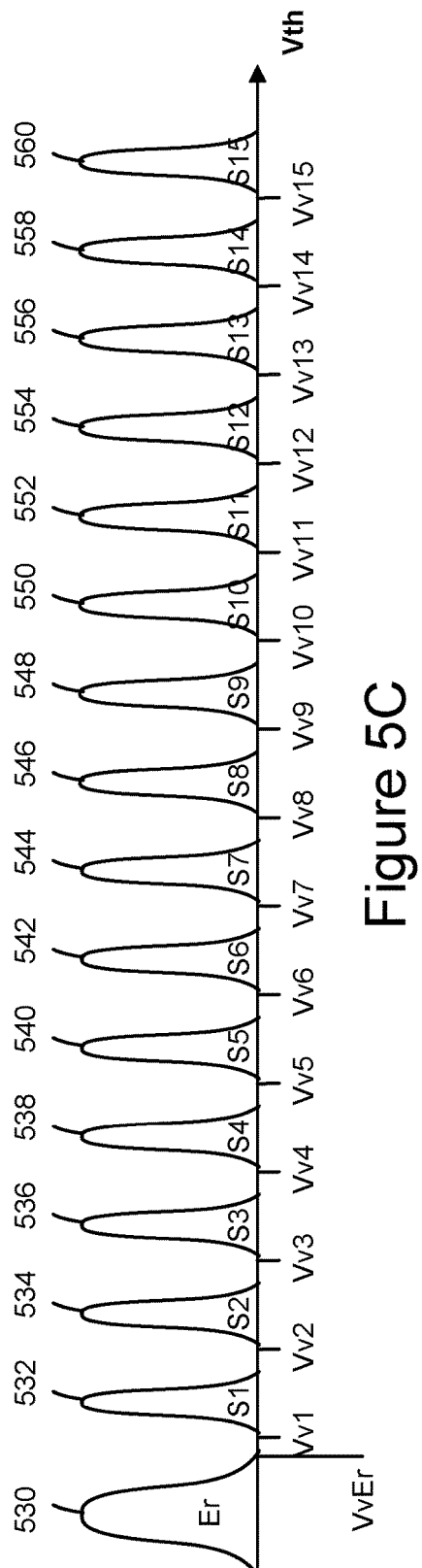

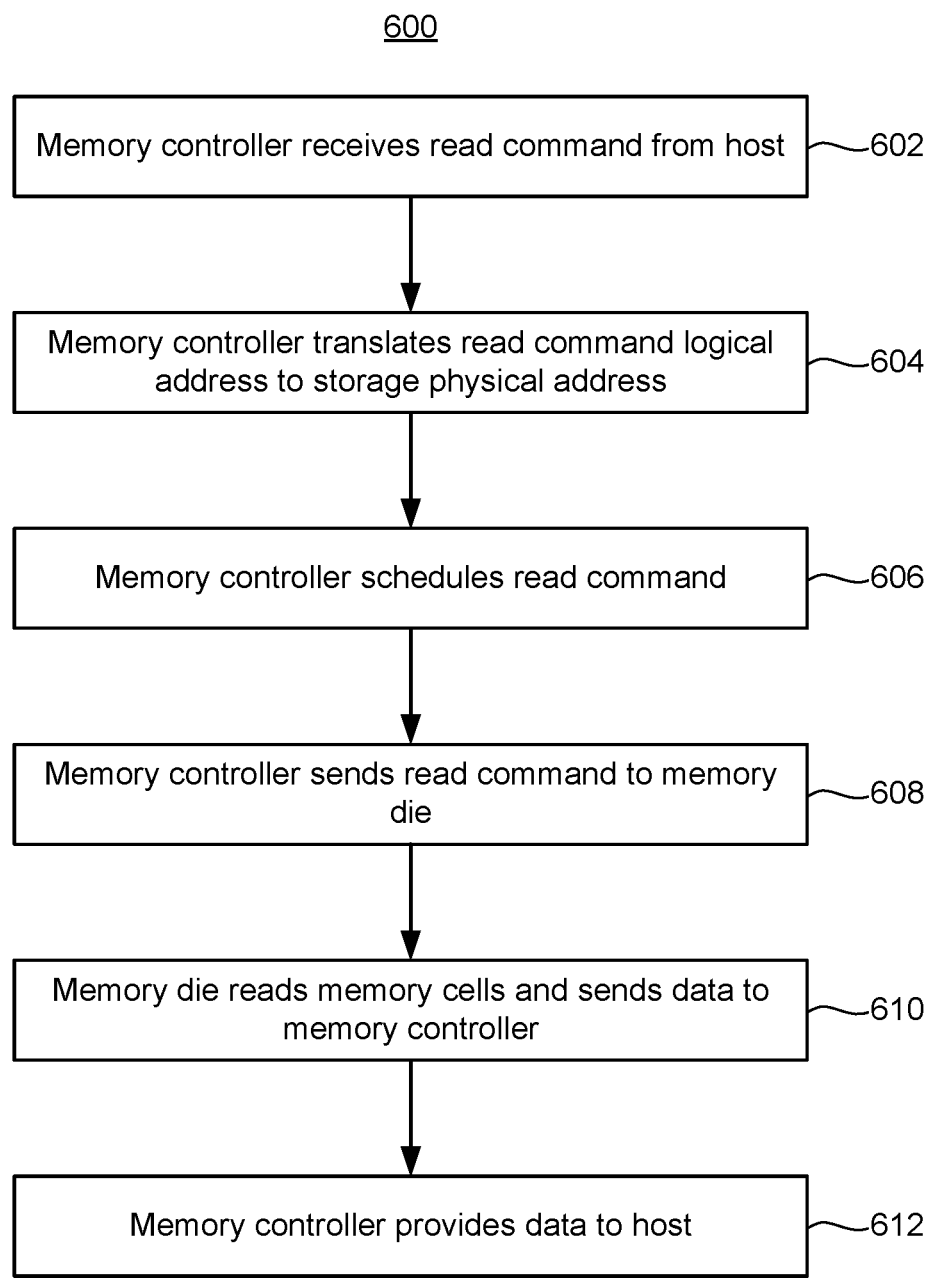

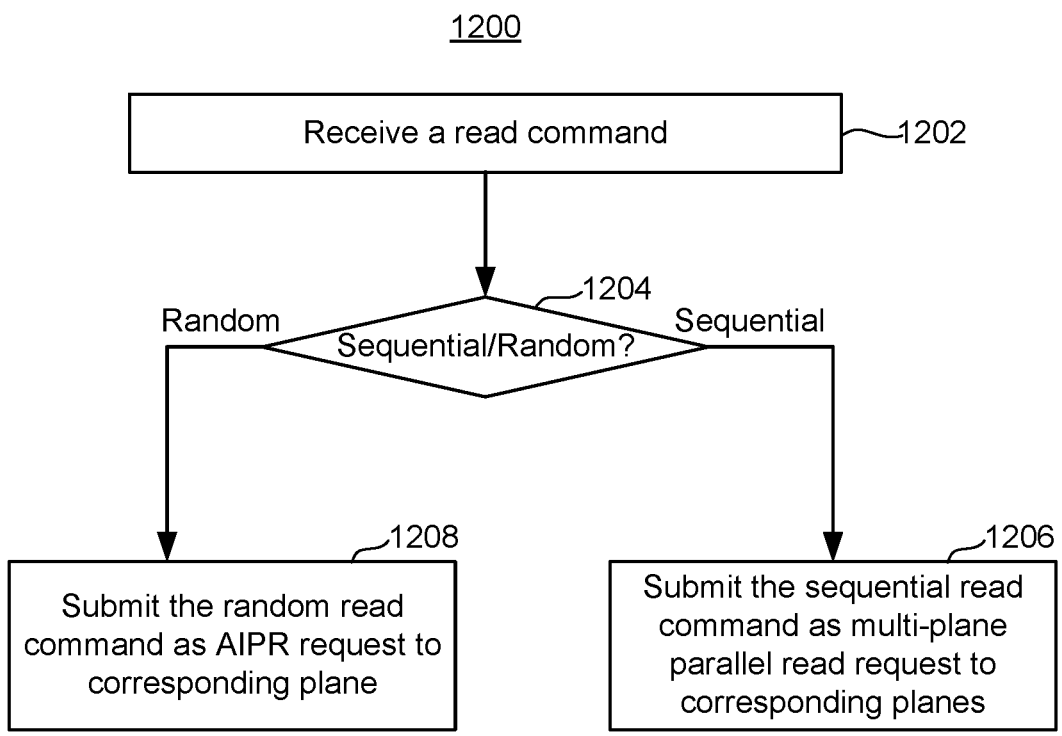

1300

1350

SPLITTING SEQUENTIAL READ COMMANDS

BACKGROUND

The present disclosure relates to non-volatile memory.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery).

The memory structure in the memory system typically contains many memory cells and various control lines. The memory structure may be arranged into units that are commonly referred to as blocks. For example, a block in a NAND memory system contains many NAND strings. A NAND string contains memory cell transistors connected in series, a drain side select gate at one end, and a source side select gate at the other end. Each NAND string is associated with a bit line. The block typically has many word lines that provide voltages to the control gates of the memory cell transistors. In some architectures, each word line connects to the control gate of one memory cell on each respective NAND string in the block. The word lines each have an address within the block, typically based on physical location. For purpose of discussion each word line (WL) in a block may be assigned a unique number (e.g., WL12, WL34, etc.) In some architectures a page is basic unit of programming and reading. The memory cells in a page may all be connected to the same word line. However, note that more than one page of memory cells could be connected to the same word line in a block.

The non-volatile memory cells may be programmed to store data. Typically, the memory cells are programmed to a number of data states. Using two data states to store a single bit per cell is referred to herein as SLC programming. Using a greater number of data states allows for more bits to be stored per memory cell. Using additional data states to store two or more bits per cell is referred to herein as multi-bit per cell programming. For example, four data states may be used to store two bits per memory cell (MLC), eight data states may be used in order to store three bits per memory cell (TLC), 16 data states may be used to store four bits per memory cell (QLC), etc.

Non-volatile storage devices may contain multiple memory dies with each die potentially containing multiple planes. Each plane contains many memory cells and has its own read/write circuitry. Thus, it is possible to read one page of memory cells in one plane in parallel with reading a page of memory cells in another plane in the same die. This can be extended to more than two planes on a die, as well as to multiple dies. Therefore, one option is to read or write multiple planes in parallel to improve throughput. By reading or writing a plane it is meant that some set (e.g., page) of memory cells in that plane is read or written. With some techniques there are, however, limitations on the parallel plane operations. For example, some techniques require that the same word line (e.g., WL12 or WL34 etc.) be read from or written to in each of the planes.

An advancement has allowed independent plane reads that do not have restrictions on the locations that are read within the different planes. For example, it is possible to read a page of memory cells in WL4 in a block in one plane with reading a page on WL34 in a block in another plane. Moreover, some independent plane reads permit SLC and multi-bit per cell reads at the same time. However, some techniques require synchronized timing of the memory operations in each plane. Synchronized timing means that the read of each plane is required to start at the same time.

In an Asynchronous Independent Plane Read (AIPR) the different reads are not required to start at the same time. The memory controller may maintain a separate command queue per each plane. The memory controller may monitor a separate ready-busy status for each plane. Therefore, after one plane finishes a read command the memory controller may submit another read command to that plane even if another plane is still occupied with a read command. This capability is especially useful when read commands differ significantly in their respective execution times. For example, an SLC read may complete much faster than a TLC read. Thus, one plane could perform multiple SLC reads while another plane performs a single slower TLC or QLC read. Although AIPR can in some cases enhance read performance, under some circumstances AIPR could hinder read performance. One potential issue is plane utilization. Specifically one or more planes may be idle during an AIPR.

A command from a host to read data will typically contain a start logical address (e.g., logical block address or LBA) and a length. The logical address is an address in the host address space. The storage device will typically translate the logical address to a physical address in the storage device. The read command may be a random read or part of a sequential read command stream. The storage device can perform more efficiently if a determination is made whether the read commands are part of a sequential read command stream. A "sequential read command stream" is a collection of one or more read commands that is collectively directed to a consecutive range of addresses having a certain minimum length. A convenient technique for defining sequential reads is based on the host logical addresses. As one example, the certain minimum length could be a logical block, which could have a length of 4 KB. Note that the sequential read command stream could include one or more read commands. Herein, the term "sequential read command" means a read command that is part of a sequential read command stream. A single read command could be a sequential read command because it has a sufficient length. For example, a single read command having a length of 64 KB may be considered a sequential read command because it has a length greater than, for example, 4 KB. Multiple shorter read commands may be considered to be sequential read commands if they are to read at consecutive addresses. For example, 164 KB read commands to read 64 KB of data at a consecutive logical address range may be considered to be a sequential read command stream. Herein, the term "random read command" means a read command that is not part of a sequential read command stream. A random read command could be, for example, a read of 4 KB at a target LBA when there is not another read command at an LBA adjacent to the target LBA. The aforementioned AIPR may be used to issue random read commands.

Challenges exist for the memory controller of the storage device to schedule a mix of random reads and sequential reads from the host. For example, a bottleneck can occur if the memory controller is waiting for one or more planes to complete one or more random reads prior to submitting a sequential read to those one or more planes. Likewise, a bottleneck can occur if the memory controller is waiting for one or more planes to complete a sequential read prior to submitting one or more random reads to those one or more planes. Also, one or more planes may be idle when random commands are submitted in AIPR mode.

BRIEF DESCRIPTION OF THE DRAWINGS

Like-numbered elements refer to common components in the different figures.

FIGS. 5A, 5B and 5C depict threshold voltage distributions.

FIG. 6 is a flowchart of one embodiment of executing a read command from a host.

FIG. 12 is a flowchart of one embodiment of a process of submitting read commands when sequential read commands are submitted as multi-plane reads.

DETAILED DESCRIPTION

Technology is disclosed herein for handling of mixed random read and sequential read command sequences. In one embodiment, plane read commands are formed from one or more sequential read commands. Each plane read command is for data stored in a single plane. As one example, a sequential read command may be split into multiple plane read commands at plane boundaries. The plane read commands are submitted to the respective planes as asynchronous independent plane read commands. Random read commands may be submitted to the planes as asynchronous independent plane read commands on par with the split sequential read commands. Therefore, AIPR may be used for both sequential read commands and random read commands. Although the memory controller may still need to wait for a plane to complete a read command to submit another read command, the ability to submit a split sequential read command to one or more planes while one or more other planes are performing a random read command can significantly improve performance. Likewise, the ability to submit a random read command to a plane while one or more other planes are performing a split sequential read command can significantly improve performance. Bottlenecks of sequential read commands waiting for random read commands to finish are avoided. Moreover, the planes are more fully utilized. Furthermore, plane utilization during read may be improved. Moreover, the overhead associated with switching between AIPR mode and submitted sequential read commands as parallel multi-plane reads is significantly reduced or even eliminated.

In one embodiment, the memory controller examines the present workload to determine whether to split the sequential read commands into plane read commands. In one embodiment, the memory controller splits the sequential read commands if the ratio of sequential read commands to random read commands is below a threshold.

Figure 1A:
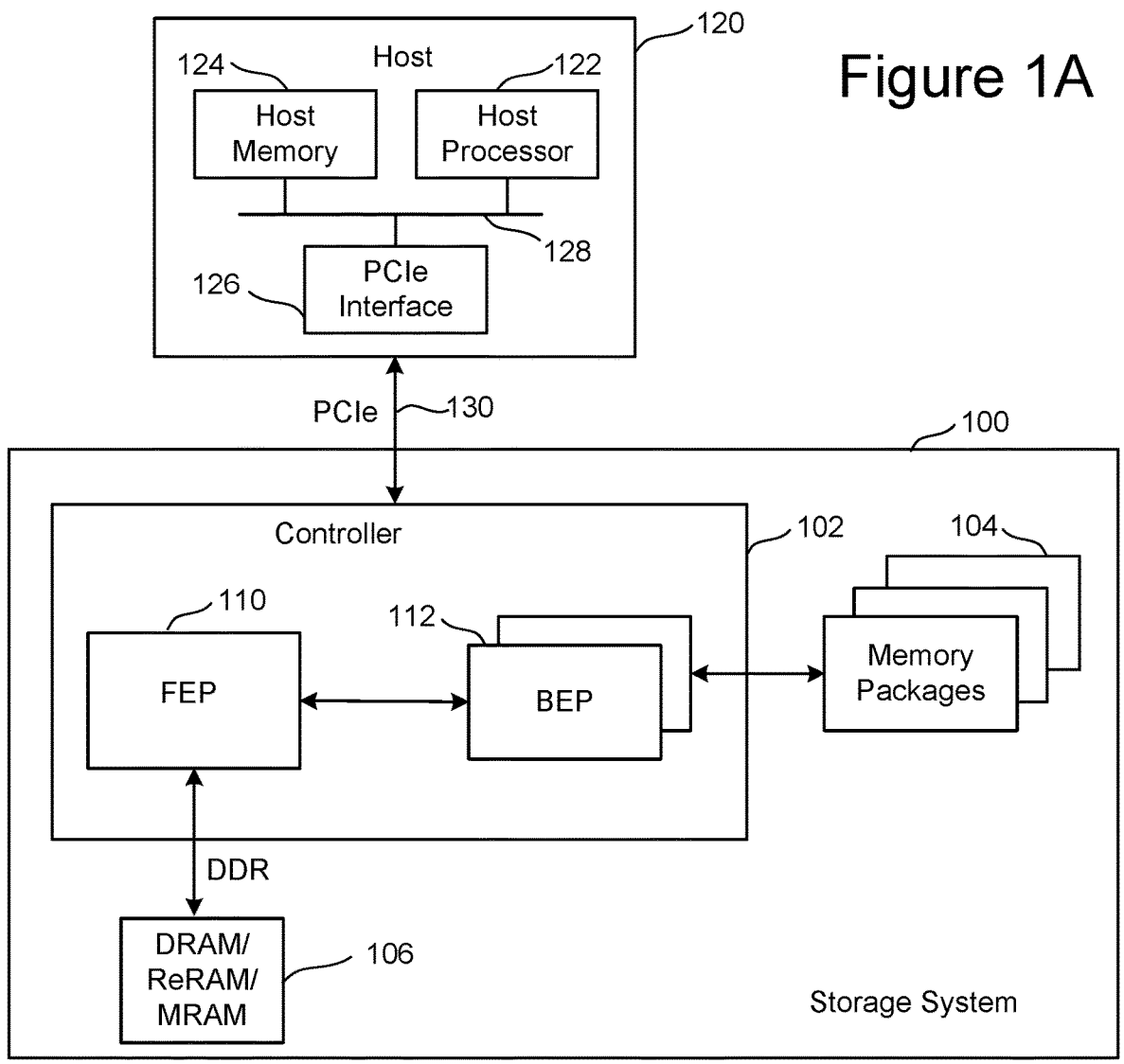
FIG. 1A is a block diagram of one embodiment of a non-volatile memory system connected to a host.

FIG. 1A is a block diagram of one embodiment of a storage system 100 that implements the technology described herein. In one embodiment, storage system 100 is a solid state drive ("SSD"). Storage system 100 can also be a memory card, USB drive or other type of storage system. The proposed technology is not limited to any one type of storage system. Storage system 100 is connected to host 120, which can be a computer, server, electronic device (e.g., smart phone, tablet or other mobile device), appliance, or another apparatus that uses memory and has data processing capabilities. In some embodiments, host 120 is separate from, but connected to, storage system 100. In other embodiments, storage system 100 is embedded within host 120.

The components of storage system 100 depicted in FIG. 1A are electrical circuits. Storage system 100 of FIG. 1A comprises a memory controller 102, non-volatile memory 104 for storing data, and local memory (e.g., DRAM/ReRAM/MRAM) 106. The combination of the controller 102 and local memory 106 may be referred to herein as a memory system. Controller 102 comprises a Front End Processor (FEP) circuit 110 and one or more Back End Processor (BEP) circuits 112. In one embodiment FEP circuit 110 is implemented on an ASIC. In one embodiment, each BEP circuit 112 is implemented on a separate ASIC. In other embodiments, a unified controller ASIC can combine both the front end and back end functions. The ASICs for each of the BEP circuits 112 and the FEP circuit 110 are implemented on the same semiconductor such that the controller 102 is manufactured as a System on a Chip ("SoC"). FEP circuit 110 and BEP circuit 112 both include their own processors. In one embodiment, FEP circuit 110 and BEP circuit 112 work as a master slave configuration where the FEP circuit 110 is the master and each BEP circuit 112 is a slave. For example, FEP circuit 110 implements a Flash Translation Layer (FTL) or Media Management Layer (MML) that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory packages/die at the request of FEP circuit 110. For example, the BEP circuit 112 can carry out the read, erase, and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages.

In one embodiment, non-volatile memory 104 comprises a plurality of memory packages. Each memory package includes one or more memory die. Therefore, controller 102 is connected to one or more non-volatile memory die. In one embodiment, each memory die in the memory packages 104 utilize NAND flash memory (including two dimensional NAND flash memory and/or three dimensional NAND flash memory). In other embodiments, the memory package can include other types of memory, such as storage class memory (SCM) based on resistive random access memory (such as ReRAM, MRAM, FeRAM or RRAM) or a phase change memory (PCM).

Controller 102 communicates with host 120 via an interface 130 that implements a protocol such as, for example, PCIe. Other interfaces can also be used, such as SCSI, SATA, etc. For working with storage system 100, host 120 includes a host processor 122, host memory 124, and a PCIe interface 126 connected along bus 128. Host memory 124 is the host's physical memory, and can be DRAM, SRAM, MRAM, non-volatile memory, or another type of storage. Host 120 is external to and separate from storage system 100. In one embodiment, storage system 100 is embedded in host 120.

Figure 1B:
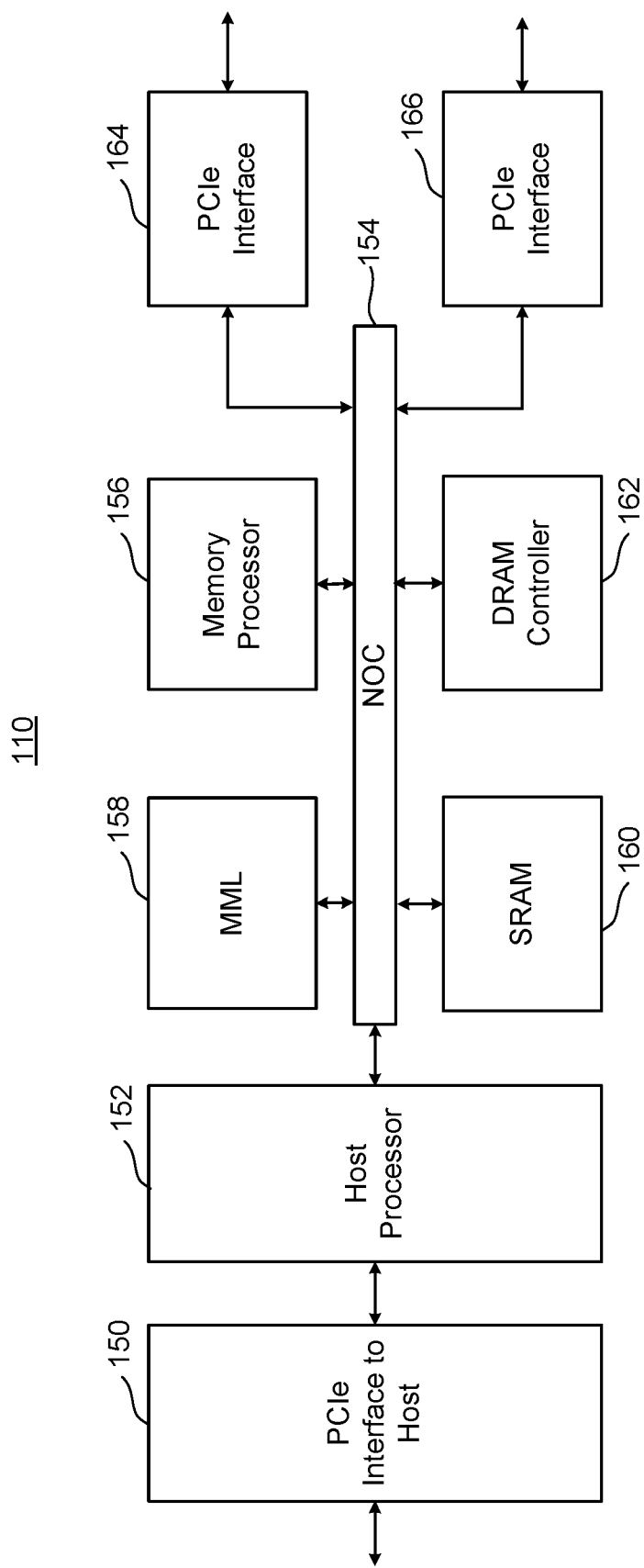
FIG. 1B is a block diagram of one embodiment of a Front End Processor Circuit. In some embodiments, the Front End Processor Circuit is part of a Controller.

FIG. 1B is a block diagram of one embodiment of FEP circuit 110. FIG. 1B shows a PCIe interface 150 (or "communication interface") to communicate with host 120 and a host processor 152 in communication with that PCIe interface. In one embodiment, host interface 150 implements an NVM Express (NVMe) over PCI Express (PCIe). Other interfaces can also be used, such as SCSI, SATA, etc. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOCs can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also, in communication with the NOC are two PCIe Interfaces 164 and 166. In the embodiment of FIG. 1B, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

FEP circuit 110 can also include a Media Management Layer (MML) 158 that performs memory management (e.g., garbage collection, wear leveling, load balancing, etc.), logical to physical address translation, communication with the host, and management of the overall operation of the SSD or other non-volatile storage system. The media management layer MML 158 may be integrated as part of the memory management that may handle memory errors and interfacing with the host. In particular, MML may be a module in the FEP circuit 110 and may be responsible for the internals of memory management.

MML 158 may implement a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 102 (e.g., the translation module) performs address translation between the logical addresses used by the host and the physical addresses used by the memory die. One example implementation is to maintain tables (e.g., "logical to physical" or "L2P" tables) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in memory packages 104 and a subset of the L2P tables are cached (L2P cache) in the local high speed memory 140.

Figure 1C:
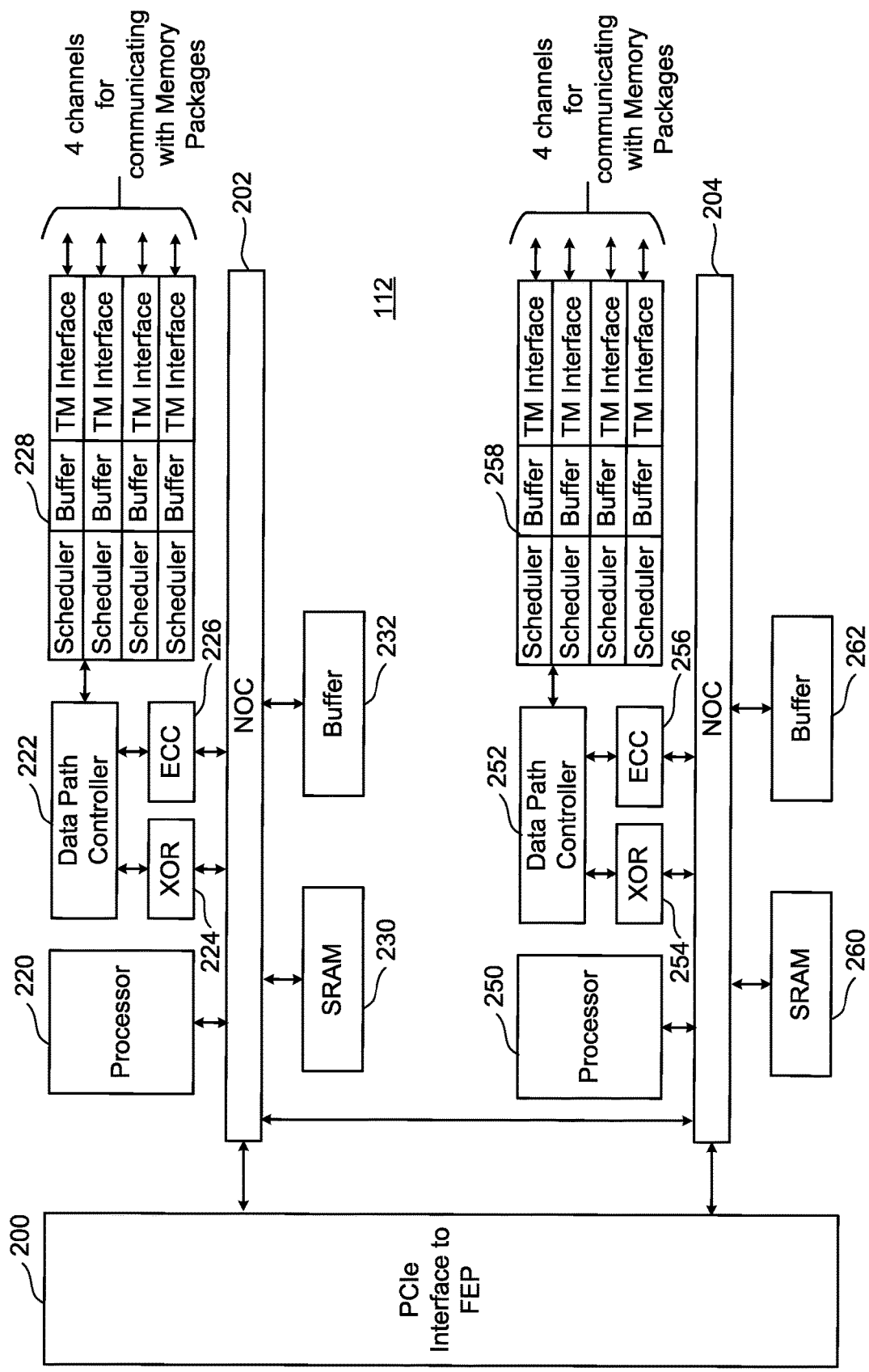
FIG. 1C is a block diagram of one embodiment of a Back End Processor Circuit. In some embodiments, the Back End Processor Circuit is part of a Controller.

FIG. 1C is a block diagram of one embodiment of the BEP circuit 112. FIG. 1C shows a PCIe Interface 200 for communicating with the FEP circuit 110 (e.g., communicating with one of PCIe Interfaces 164 and 166 of FIG. 1B). PCIe Interface 200 is in communication with two NOCs 202 and 204. In one embodiment the two NOCs can be combined into one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. In one embodiment, ECC engines 226/256 are electrical circuits programmed by software. For example, ECC engines 226/256 can be a processor that can be programmed. In other embodiments, ECC engines 226/256 are custom and dedicated hardware circuits without any software. In another embodiment, the function of ECC engines 226/256 is implemented by processor 220. The XOR engines 224/254 are used to XOR the data so that data can be combined and stored in a manner that can be recovered in case there is a programming error.

Data path controller 222 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. There could be more or fewer than four channels. Each interface 228/258 includes four Toggle Mode interfaces (TM Interface), four buffers and four schedulers. In an embodiment, there is one scheduler, buffer, and TM Interface for each of the channels.

The processors 220/250 can be any standard processor known in the art. The data path controllers 222/252 can be a processor, FPGA, microprocessor, or other type of controller. The XOR engines 224/254 and ECC engines 226/256 are dedicated hardware circuits, known as hardware accelerators. In other embodiments, the XOR engines 224/254 and ECC engines 226/256 can be implemented in software. In an embodiment, the scheduler, buffer, and TM Interfaces are hardware circuits.

Figure 1D:
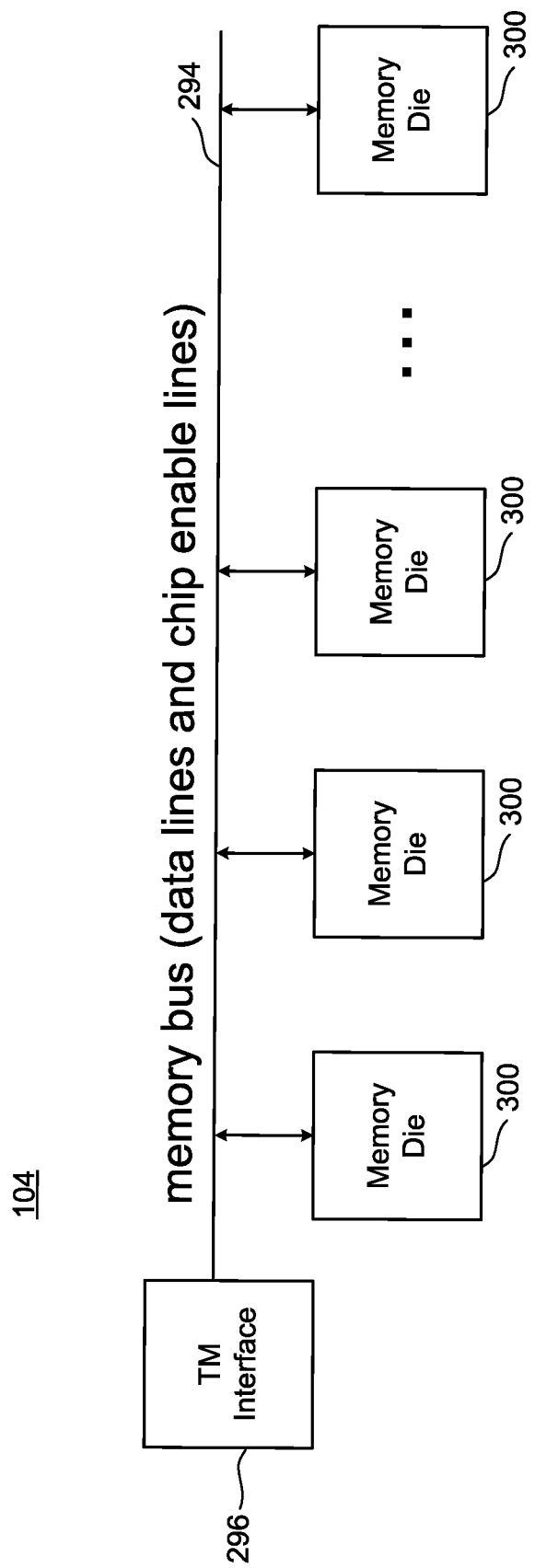
FIG. 1D is a block diagram of one embodiment of a memory package.

FIG. 1D is a block diagram of one embodiment of a memory package 104 that includes a plurality of memory die 300 connected to a memory bus (data lines and chip enable lines) 294. The memory bus 294 connects to a Toggle Mode Interface 296 for communicating with the TM Interface of a BEP circuit 112 (see e.g., FIG. 1C). In some embodiments, the memory package can include a small controller connected to the memory bus and the TM Interface. The memory package can have one or more memory dies. In one embodiment, each memory package includes eight or 16 memory dies; however, other numbers of memory dies can also be implemented. The technology described herein is not limited to any particular number of memory dies.

Figure 2A:
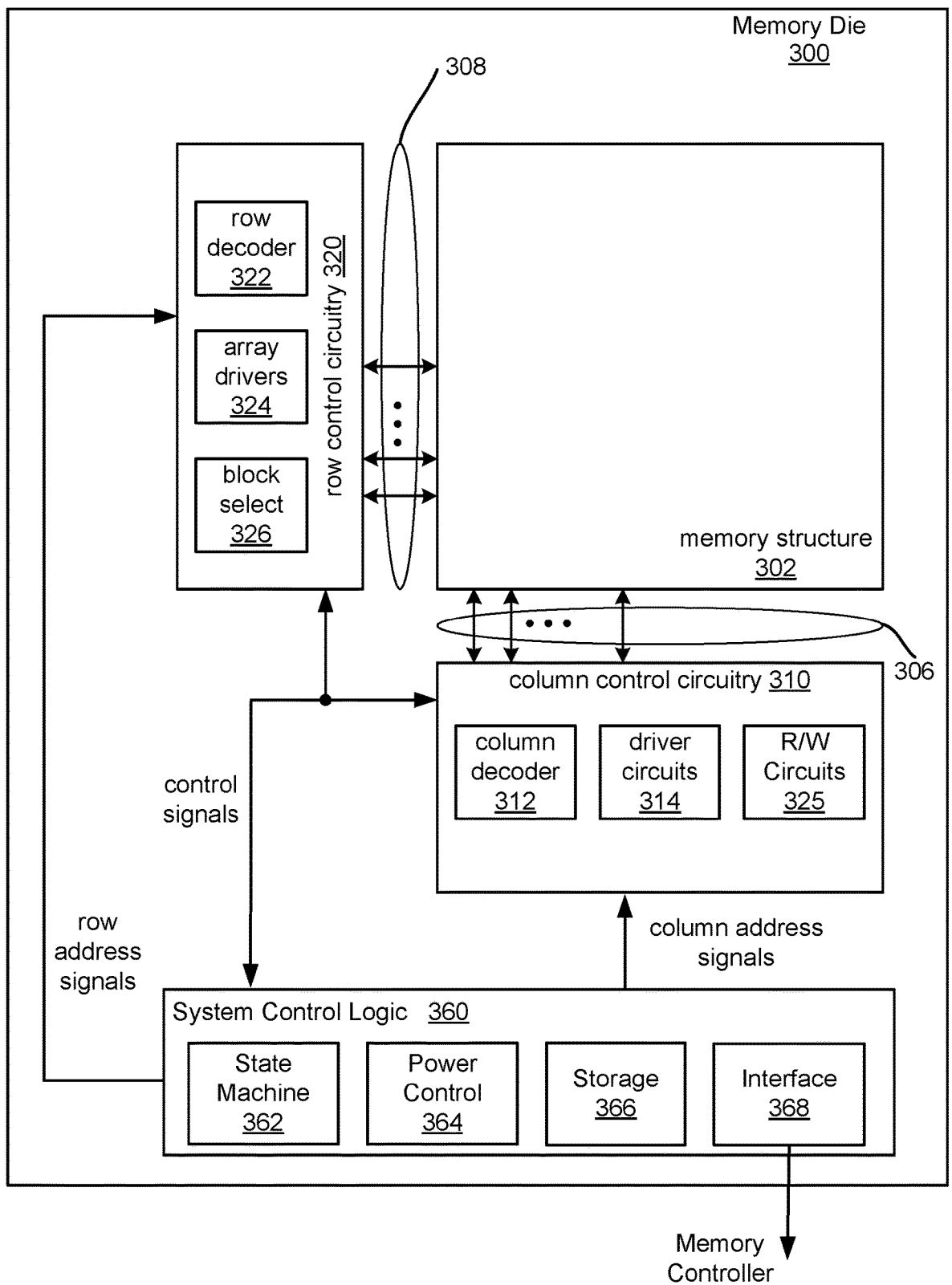
FIG. 2A is a block diagram of one embodiment of a memory die.

In one embodiment, non-volatile storage system 100 comprises one or more memory dies. FIG. 2A is a functional block diagram of one embodiment of a memory die 300 that comprises non-volatile storage system 100. Each of the one or more memory dies of non-volatile storage system 100 can be implemented as memory die 300 of FIG. 2A. The components depicted in FIG. 2A are electrical circuits. Memory die 300 includes a memory structure 302 (e.g., memory array) that can comprise non-volatile memory cells (also referred to as non-volatile storage cells), as described in more detail below. The array terminal lines of memory structure 302 include the various layer(s) of word lines organized as rows, and the various layer(s) of bit lines organized as columns. However, other orientations can also be implemented. Memory die 300 includes row control circuitry 320, whose outputs are connected to respective word lines of the memory structure 302. Row control circuitry 320 receives a group of M row address signals and one or more various control signals from System Control Logic circuit 360, and typically may include such circuits as row decoders 322, array drivers 324, and block select circuitry 326 for both reading and writing (programming) operations. Row control circuitry 320 may also include read/write circuitry. Memory die 300 also includes column control circuitry 310 including read/write circuits 325. The read/write circuits 325 may contain sense amplifiers and data latches. The sense amplifier(s) input/outputs are connected to respective bit lines of the memory structure 302. Although only a single block is shown for structure 302, a memory die can include multiple arrays that can be individually accessed. Column control circuitry 310 receives a group of N column address signals and one or more various control signals from System Control Logic 360, and typically may include such circuits as column decoders 312, array terminal receivers or driver circuits 314, as well as read/write circuitry 325, and I/O multiplexers.

System control logic 360 receives data and commands from memory controller 102 and provides output data and status to the host. In some embodiments, the system control logic 360 (which comprises one or more electrical circuits) includes state machine 362 that provides die-level control of memory operations. In one embodiment, the state machine 362 is programmable by software. In other embodiments, the state machine 362 does not use software and is completely implemented in hardware (e.g., electrical circuits). In another embodiment, the state machine 362 is replaced by a micro-controller or microprocessor, either on or off the memory chip. System control logic 360 can also include a power control module 364 that controls the power and voltages supplied to the rows and columns of the memory structure 302 during memory operations. System control logic 360 includes storage 366 (e.g., RAM, registers, latches, etc.), which may be used to store parameters for operating the memory structure 302.

Commands and data are transferred between memory controller 102 and memory die 300 via memory controller interface 368 (also referred to as a "communication interface"). Memory controller interface 368 is an electrical interface for communicating with memory controller 102. Examples of memory controller interface 368 include a Toggle Mode Interface and an Open NAND Flash Interface (ONFI). Other I/O interfaces can also be used.

In some embodiments, all the elements of memory die 300, including the system control logic 360, can be formed as part of a single die. In other embodiments, some or all of the system control logic 360 can be formed on a different die than the die that contains the memory structure 302.

In one embodiment, memory structure 302 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 302 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 302 is not limited to the examples above. Many different types of memory array architectures or memory technologies can be used to form memory structure 302. No particular non-volatile memory technology is required for purposes of the new claimed embodiments proposed herein. Other examples of suitable technologies for memory cells of the memory structure 302 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 302 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of current, voltage, light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 302 and (2) peripheral circuitry, which includes all of the other components depicted in FIG. 2A. An important characteristic of a memory circuit is its capacity, which can be increased by increasing the area of the memory die of storage system 100 that is given over to the memory structure 302; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 360, reduced availability of area can limit the available functionalities that can be implemented on-chip. Consequently, a basic trade-off in the design of a memory die for the storage system 100 is the amount of area to devote to the memory structure 302 and the amount of area to devote to the peripheral circuitry.

Another area in which the memory structure 302 and the peripheral circuitry are often at odds is in the processing involved in forming these regions, since these regions often involve differing processing technologies and the trade-off in having differing technologies on a single die. For example, when the memory structure 302 is NAND flash, this is an NMOS structure, while the peripheral circuitry is often CMOS based. For example, elements such sense amplifier circuits, charge pumps, logic elements in a state machine, and other peripheral circuitry in system control logic 360 often employ PMOS devices. Processing operations for manufacturing a CMOS die will differ in many aspects from the processing operations optimized for an NMOS flash NAND memory or other memory cell technologies. Three-dimensional NAND structures in particular may benefit from specialized processing operations.

To improve upon these limitations, embodiments described below can separate the elements of FIG. 2A onto separately formed dies that are then bonded together. More specifically, the memory structure 302 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more dies, such as two memory dies and one control die, for example.

Figure 2B:
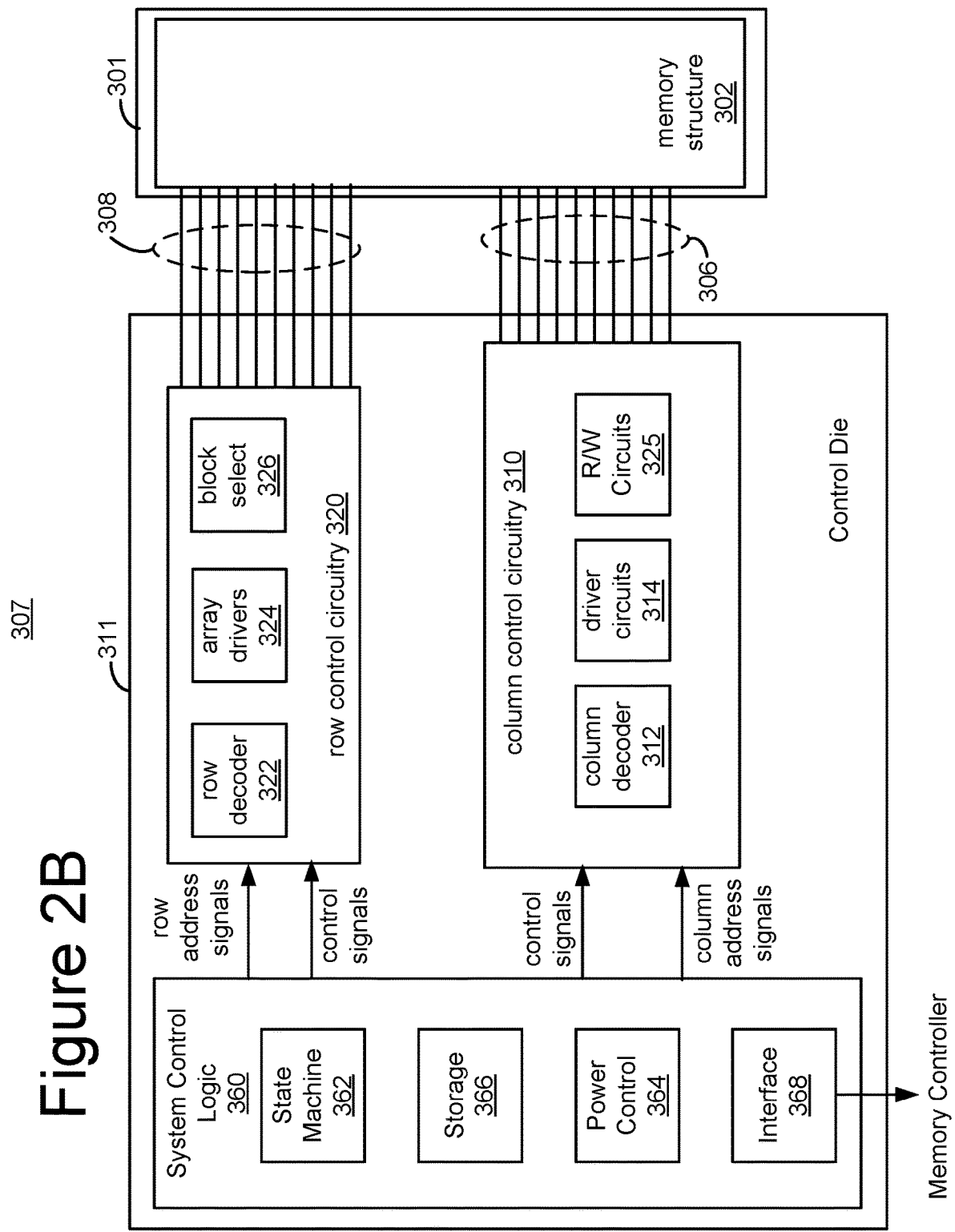
FIG. 2B is a block diagram of one embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 307. One or more integrated memory assemblies 307 may be used in the memory packages 104 of storage system 100. The integrated memory assembly 307 includes two types of semiconductor dies (or more succinctly, "die"). Memory structure die 301 includes memory structure 302. Memory structure 302 includes non-volatile memory cells. Control die 311 includes control circuitry 360, 310, and 320 (as described above). In some embodiments, control die 311 is configured to connect to the memory structure 302 in the memory structure die 301. In some embodiments, the memory structure die 301 and the control die 311 are bonded together.

FIG. 2B shows an example of the peripheral circuitry, including control circuits, formed in a peripheral circuit or control die 311 coupled to memory structure 302 formed in memory structure die 301. Common components are labelled similarly to FIG. 2A. System control logic 360, row control circuitry 320, and column control circuitry 310 are located in control die 311. In some embodiments, all or a portion of the column control circuitry 310 and all or a portion of the row control circuitry 320 are located on the memory structure die 301. In some embodiments, some of the circuitry in the system control logic 360 is located on the on the memory structure die 301.

System control logic 360, row control circuitry 320, and column control circuitry 310 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 360, row control circuitry 320, and column control circuitry 310). Thus, while moving such circuits from a die such as memory structure die 301 may reduce the number of steps needed to fabricate such a die, adding such circuits to a die such as control die 311 may not require many additional process steps. The control die 311 could also be referred to as a CMOS die, due to the use of CMOS technology to implement some or all of control circuitry 360, 310, 320.

Figure 3A:
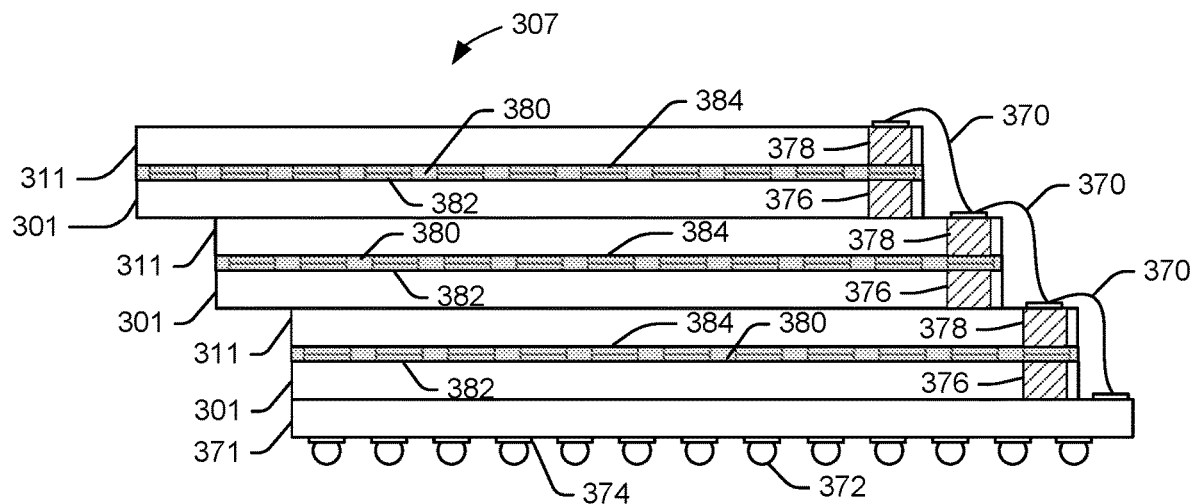
FIGS. 3A and 3B depict different embodiments of integrated memory assemblies.
Figure 3B:
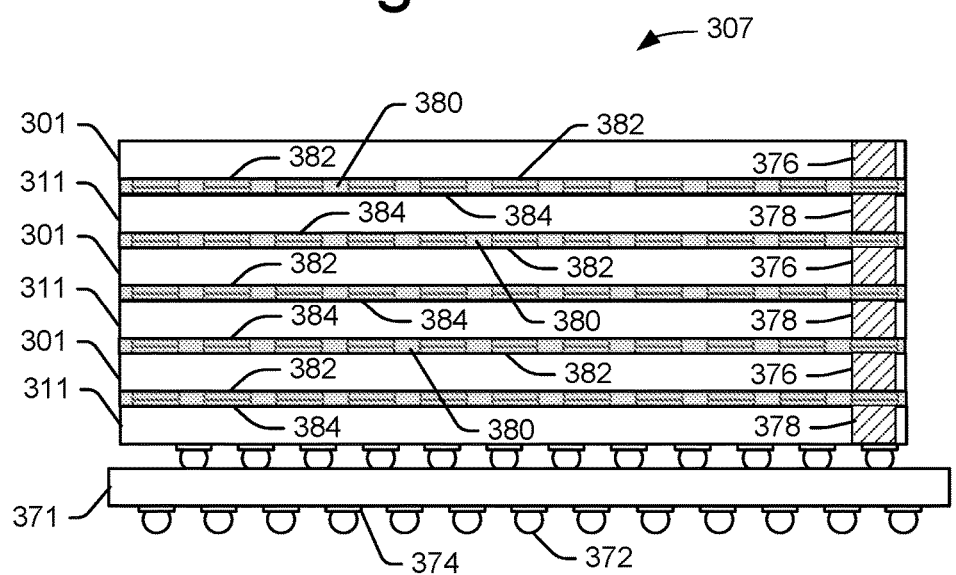

FIG. 3B shows column control circuitry 310 including read/write circuits 325 on the control die 311 coupled to memory structure 302 on the memory structure die 301 through electrical paths 306. For example, electrical paths 306 may provide electrical connection between column decoder 312, driver circuitry 314, and R/W circuits 325 and bit lines of memory structure 302. Electrical paths may extend from column control circuitry 310 in control die 311 through pads on control die 311 that are bonded to corresponding pads of the memory structure die 301, which are connected to bit lines of memory structure 302. Each bit line of memory structure 302 may have a corresponding electrical path in electrical paths 306, including a pair of bond pads, which connects to column control circuitry 310. Similarly, row control circuitry 320, including row decoder 322, array drivers 324, and block select 326 are coupled to memory structure 302 through electrical paths 308. Each electrical path 308 may correspond to a word line, dummy word line, or select gate line. Additional electrical paths may also be provided between control die 311 and memory structure die 301.

For purposes of this document, the phrases "a control circuit" or "one or more control circuits" can include any one of or any combination of memory controller 102, FEP 110, BEP 112, state machine 362, data path controller 222, interface 228/258, processor 156, 220, MML 158, all or a portion of system control logic 360, all or a portion of row control circuitry 320, all or a portion of column control circuitry 310, read/write circuits 325, sense amps, a microcontroller, a microprocessor, and/or other similar functioned circuits. A control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

For purposes of this document, the term "apparatus" can include, but is not limited to, one or more of, storage system 100, memory controller 102, storage system 100, memory die 300, integrated memory assembly 307, and/or control die 311.

In some embodiments, there is more than one control die 311 and more than one memory structure die 301 in an integrated memory assembly 307. In some embodiments, the integrated memory assembly 307 includes a stack of multiple control dies 311 and multiple memory structure dies 301. FIG. 3A depicts a side view of an embodiment of an integrated memory assembly 307 stacked on a substrate 371 (e.g., a stack comprising control die 311 and memory structure die). The integrated memory assembly 307 has three control dies 311 and three memory structure dies 301. In some embodiments, there are more than three memory structure dies 301 and more than three control dies 311. In FIG. 3A there are an equal number of memory structure dies 301 and control dies 311; however, in one embodiment, there are more memory structure dies 301 than control dies 311. For example, one control die 311 could control multiple memory structure dies 301.

Each control die 311 is affixed (e.g., bonded) to at least one of the memory structure die 301. Some of the bond pads 382/284 are depicted. There may be many more bond pads. A space between two die 301, 311 that are bonded together is filled with a solid layer 380, which may be formed from epoxy or other resin or polymer. This solid layer 380 protects the electrical connections between the die 301, 311, and further secures the die together. Various materials may be used as solid layer 380, but in embodiments, it may be Hysol epoxy resin from Henkel Corp., having offices in California, USA.

The integrated memory assembly 307 may for example be stacked with a stepped offset, leaving the bond pads at each level uncovered and accessible from above. Wire bonds 370 connected to the bond pads connect the control die 311 to the substrate 371. A number of such wire bonds may be formed across the width of each control die 311 (i.e., into the page of FIG. 3A).

A memory die through silicon via (TSV) 376 may be used to route signals through a memory structure die 301. A control die through silicon via (TSV) 378 may be used to route signals through a control die 311. The TSVs 376, 378 may be formed before, during or after formation of the integrated circuits in the semiconductor dies 301, 311. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 372 may optionally be affixed to contact pads 374 on a lower surface of substrate 371. The solder balls 372 may be used to couple the integrated memory assembly 307 electrically and mechanically to a host device such as a printed circuit board. Solder balls 372 may be omitted where the integrated memory assembly 307 is to be used as an LGA package. The solder balls 372 may form a part of the interface between integrated memory assembly 307 and memory controller 102.

FIG. 3B depicts a side view of another embodiment of an integrated memory assembly 307 stacked on a substrate 371. The integrated memory assembly 307 of FIG. 3B has three control dies 311 and three memory structure dies 301. In some embodiments, there are many more than three memory structure dies 301 and many more than three control dies 311. In this example, each control die 311 is bonded to at least one memory structure die 301. Optionally, a control die 311 may be bonded to two or more memory structure dies 301.

Some of the bond pads 382, 384 are depicted. There may be many more bond pads. A space between two dies 301, 311 that are bonded together is filled with a solid layer 380, which may be formed from epoxy or other resin or polymer. In contrast to the example in FIG. 3A, the integrated memory assembly 307 in FIG. 3B does not have a stepped offset. A memory die through silicon via (TSV) 376 may be used to route signals through a memory structure die 301. A control die through silicon via (TSV) 378 may be used to route signals through a control die 311.

Solder balls 372 may optionally be affixed to contact pads 374 on a lower surface of substrate 371. The solder balls 372 may be used to couple the integrated memory assembly 307 electrically and mechanically to a host device such as a printed circuit board. Solder balls 372 may be omitted where the integrated memory assembly 307 is to be used as an LGA package.

As has been briefly discussed above, the control die 311 and the memory structure die 301 may be bonded together. Bond pads on each die 301, 311 may be used to bond the two die together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 µm square and spaced from each other with a pitch of 5 µm to 5 µm. While this process is referred to herein as Cu-to-Cu bonding, this term may also apply even where the bond pads are formed of materials other than Cu.

When the area of bond pads is small, it may be difficult to bond the semiconductor die together. The size of, and pitch between, bond pads may be further reduced by providing a film layer on the surfaces of the semiconductor die including the bond pads. The film layer is provided around the bond pads. When the die are brought together, the bond pads may bond to each other, and the film layers on the respective die may bond to each other. Such a bonding technique may be referred to as hybrid bonding. In embodiments using hybrid bonding, the bond pads may be about 5 µm square and spaced from each other with a pitch of 1 µm to 5 µm. Bonding techniques may be used providing bond pads with even smaller sizes and pitches.

Some embodiments may include a film on surface of the dies 301, 311. Where no such film is initially provided, a space between the die may be under filled with an epoxy or other resin or polymer. The under-fill material may be applied as a liquid which then hardens into a solid layer. This under-fill step protects the electrical connections between the dies 301, 311, and further secures the die together. Various materials may be used as under-fill material.

Figure 4:
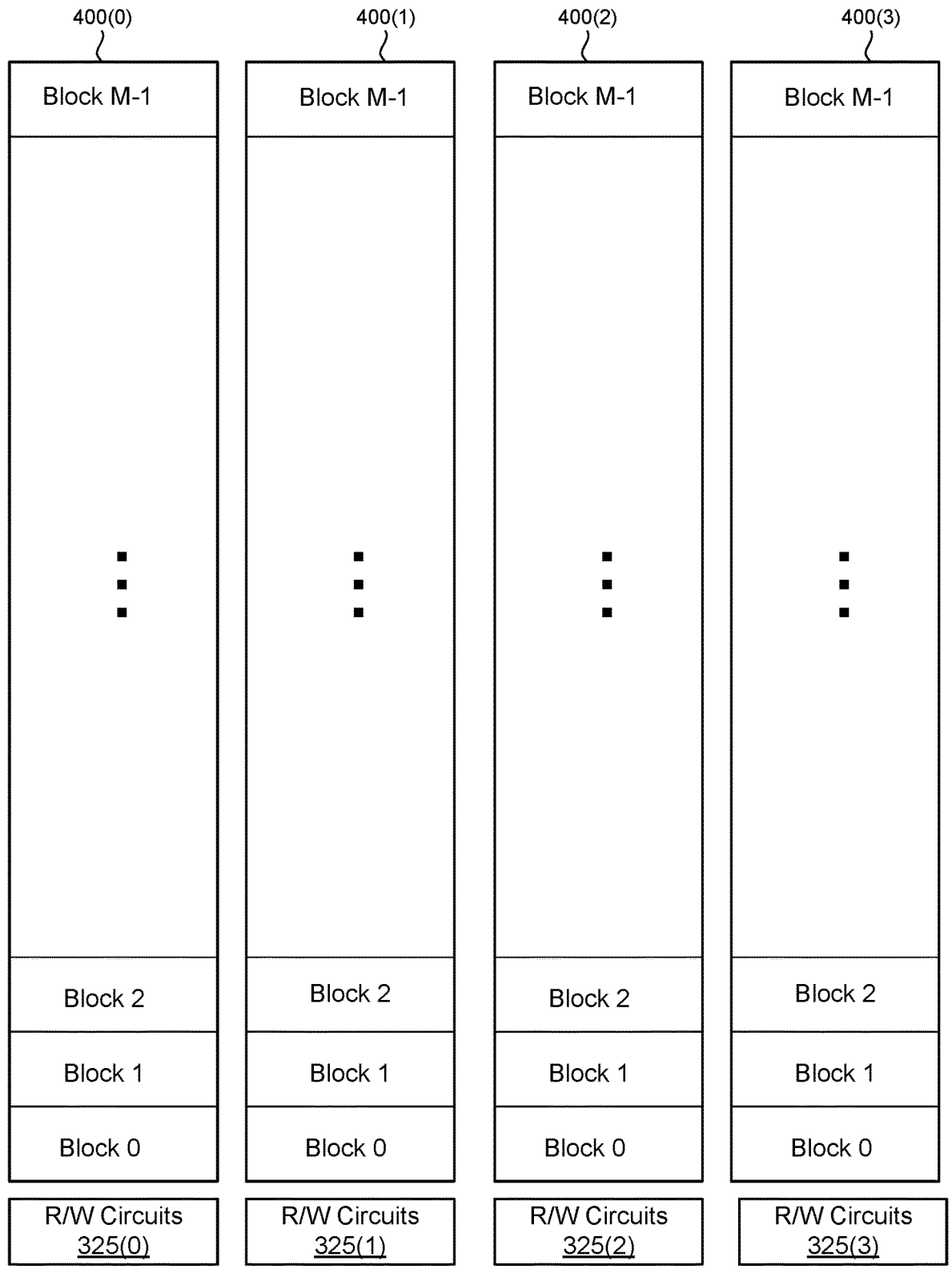
FIG. 4 is a block diagram of one embodiment of a memory die having four planes.

FIG. 4 is a block diagram explaining one example organization of memory die, which is divided into four planes 400(0), 400(1), 400(2), 400(3). Each plane is then divided into M blocks. In one example, each plane 400 has about 2000 blocks. However, different numbers of blocks and planes can also be used. In one embodiment, a block of memory cells is a unit of erase. That is, all memory cells of a block are erased together. In other embodiments, blocks can be divided into sub-blocks and the sub-blocks can be the unit of erase. Memory cells can also be grouped into blocks for other reasons, such as to organize the memory structure to enable the signaling and selection circuits. In some embodiments, a block represents a group of connected memory cells as the memory cells of a block share a common set of word lines. For example, the word lines for a block are all connected to all of the vertical NAND strings for that block. Although FIG. 4 shows four planes 400(0)-400(3), more or fewer than four planes can be implemented. In some embodiments, memory structure 302 includes eight planes.

A physical block may be divided into physical pages. A physical page is a set of memory cells that can be read or programmed concurrently in a physical block. In one example, a page is the unit of programming and/or the unit of reading, and a page comprises data in memory cells connected to a same word line. In other examples, different units of programming and reading can be used, and different arrangements of pages can be used. In some embodiments, pages are divided into fragments (also referred flash management units). A logical sector is a unit of data (typically 512 Bytes) that the host identifies by an LBA. In some example implementations, a fragment is the unit of programming and/or the unit of reading. In an embodiment, each fragment corresponds to one ECC codeword. In one example implementation, a page is 16 KB of data and a fragment is 4 KB of data; however, other amounts can also be implemented.

Each plane 400 has R/W circuits 325 associated therewith to enable each plane 400 to be programmed and/or read. In some embodiments, programming and/or reading can be performed in parallel in a first selected block in plane 400(0), a second selected block in plane 400(1), a third selected block in plane 400(2), and a fourth selected block in plane 400(3). For example, first data can be sent to R/W circuits 325(0) and programmed into memory cells on one of the blocks in plane 400(0), second data can be sent to R/W circuits 325(1) and programmed into memory cells on one of the blocks in plane 400(1), third data can be sent to R/W circuits 325(2) and programmed into memory cells on one of the blocks in plane 400(2), and fourth data can be sent to R/W circuits 325(3) and programmed into memory cells on one of the blocks in plane 400(3). As another example, R/W circuits 325(1) can read data from memory cells in a selected block in plane 400(0) while R/W circuits 325(1) reads data from memory cells in a selected block in plane 400(1) and while R/W circuits 325(2) reads data from memory cells in a selected block in plane 400(2) and while R/W circuits 325(3) reads data from memory cells in a selected block in plane 400(3).

In one embodiment, based on a sequential read command or stream from host 120, the memory controller 102 could instruct planes 400(0)-400(3) to each read a page of memory cells in a multi-plane parallel read (by which it is meant that the R/W circuits 325 will read the memory cells in the corresponding plane). The multi-plane parallel read could be synchronized in that the read of each plane 400(0)-400(3) starts at the same time. In one embodiment, rather than a multi-plane parallel the memory controller 102 divides the sequential read command or stream at plane boundaries and submits a read command to two or more of the planes 400 as asynchronous independent plane reads. Random reads can be submitted to the planes 400(0)-400(3) on par with the split portions of the sequential command or stream. Submitting on par means that a split portion of the sequential read can execute on one plane at the same time as a random read on another plane. For example, one random read might be submitted to plane 400(0), a different random read might be submitted to plane 400(1), and a sequential read command might be split into a first read submitted to plane 400(2) and a second read submitted to plane 400(3). This can improve performance by, for example, preventing random reads from blocking a sequential read or from preventing a sequential read from blocking random reads. This may also improve performance by reducing or eliminating switches from an AIPR mode in which only random reads are serviced and a non-AIPR mode in which sequential reads are serviced.

The memory systems discussed above can be erased, programmed and read. Each memory cell may be associated with a memory state according to write data in a program command. Based on its memory state, a memory cell will either remain in the erased state or be programmed to a memory state (a programmed memory state) different from the erased state.

For example, in a two-bit per cell memory device (sometimes referred to as a multi-level cell (MLC)), there are four memory states including the erased state and three programmed memory states referred to as the A, B and C memory states. In a three-bit per cell memory device (sometimes referred to as a tri-level cell (TLC)), there are eight memory states including the erased state and seven programmed memory states referred to as the A, B, C, D, E, F and G memory states. In a four-bit per cell memory device (sometimes referred to as a quad-level cell (QLC)), there are sixteen memory states including the erased state and fifteen programmed memory states referred to as the Er, S1, S2, S3, S4, S5, S6, S7, S8, S9, S10, S11, S12, S13, S14 and S15 memory states.

FIG. 5A depicts an embodiment of threshold voltage Vth distributions for a four-state memory device in which each memory cell stores two bits of data. A first threshold voltage Vth distribution 500 is provided for erased (Er-state) storage elements. Three threshold voltage Vth distributions 502, 504 and 506 represent programmed memory states A, B and C, respectively. A 2-bit code having lower and upper bits can be used to represent each of the four memory states. In an embodiment, the "Er," "A," "B," and "C" memory states are respectively represented by "11," "01," "00," and "10."

FIG. 5B depicts an embodiment of threshold voltage Vth distributions for an eight-state memory device in which each memory cell stores three bits of data. A first threshold voltage Vth distribution 510 is provided for Er-state storage elements. Seven threshold voltage Vth distributions 512, 514, 516, 518, 520, 522 and 524 represent programmed memory states A, B, C, D, E, F and G, respectively. A 3-bit code having lower page, middle page and upper page bits can be used to represent each of the eight memory states. In an embodiment, the "Er," "A," "B," "C," "D," "E," "F" and "G" memory states are respectively represented by "111," "011," "001," "000," "010," "110," "100" and "101."

FIG. 5C depicts an embodiment of threshold voltage Vth distributions for a sixteen-state memory device in which each memory cell stores four bits of data. A first threshold voltage Vth distribution 530 is provided for erased Er-state storage elements. Fifteen threshold voltage Vth distributions 532, 534, 536, 538, 540, 542, 544, 546, 548, 550, 552, 554, 556, 558 and 560 represent programmed memory states S1, S2, S3, S4, S5, S6, S7, S8, S9, S10, S11, S12, S13, S14 and S15, respectively.

A 4-bit code having lower page, middle page, upper page and top page bits can be used to represent each of the sixteen memory states. In an embodiment, the S0, S1, S2, S3, S4, S5, S6, S7, S8, S9, S10, S11, S12, S13, S14 and S15 memory states are respectively represented by "1111," "1110," "1100," "1101," "1001," "0001," "0101," "0100," "0110," "0010," "0000," "1000," "1010," "1011," "0011," and "0111," respectively.

The technology described herein also can be used with other types of programming in addition to full sequence programming (including, but not limited to, multiple stage/phase programming). In some embodiments, programmed states (e.g., S1-S15) can overlap, with controller 102 (FIG. 1) relying on error correction to identify the correct data being stored.

FIG. 6 is a flowchart of one embodiment of a process 600 of responding to a read command from a host. Step 602 includes the memory controller 102 receiving a read command from host 120. The read command may specify a logical address (LA) in the host's address space. In one embodiment, the read command specifies an LBA. The read command also specifies a length of data to read. In an embodiment, the memory controller 102 receives the sequential read command by way of host interface 150 from the host 120.

Step 604 includes the memory controller 102 translating the logical address to a physical address in the memory packages 104. The physical address will specify the location of the memory cells that store the requested data. The physical address may specify the memory die 300, the plane 400, the block, the word line, a physical page of memory cells, etc. In an embodiment, the memory controller 102 maintains one or more L2P tables that are used in the translation. In an embodiment, MML 158 performs the translation.

Step 606 includes the memory controller 102 scheduling the read command. In an embodiment, one of the schedulers in the interface 228/258 (see interface 228/258 in FIG. 1C) schedules the read command for one of the channels. In one embodiment, when the storage system is in a first mode a sequential read command is scheduled as a number of asynchronous independent plane read (AIPR) commands. However, in another embodiment, when the storage system is in a second mode a sequential read command is scheduled as a multi-plane parallel read.

Step 608 includes the memory controller 102 sending the read command to a memory die. In an embodiment, the read command is sent to a memory die by a TM interface (see TM interface in FIG. 1C). The read command could be sent to a memory die 300 or a control die 311.

Step 610 includes the memory die executing the read command. The system control logic 360 may oversee the operation of the die level read. The row control circuitry 320 and column control circuitry 310 read the data from the memory cells in the memory structure 302 (see FIG. 2A or 2B). The data is sent back to the memory controller by the interface 368.

Step 612 includes the memory controller 102 providing the data to the host 120. Step 612 may include using the ECC engine 226/256 to decode and error correct the data. The memory controller 102 may send the data to the host 120 along with other data that was read by other read commands. Some memory protocols may have command ordering in which the host 120 expects to receive the data back in the same order in which the read commands were issued by the host 120. If this case, the memory controller 102 will take care of any such ordering of the data sent to the host 120.

Figure 7:
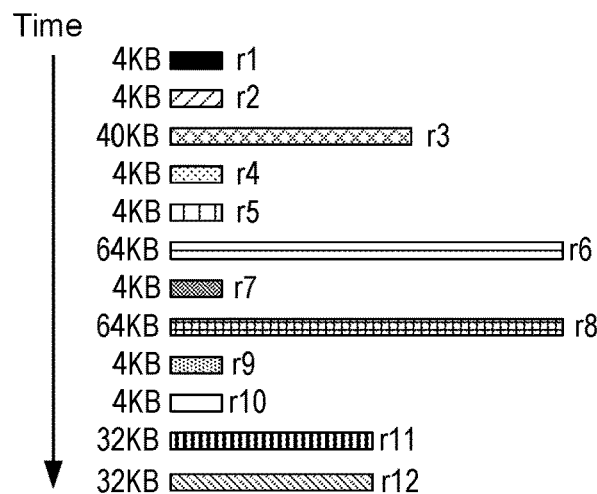
FIG. 7 depicts a number of read commands sent from host to memory controller over a period of time.

FIG. 7 depicts a number of read commands. In one embodiment, these correspond to read commands sent from host 120 to memory controller 102 over a period of time. These read commands might be on one or more commands queues, but command queuing is not required. The host 120 will specify a logical address (e.g., LBA) that indicates the start of each read command. The memory controller 102 may translate the logical address to a physical address prior to scheduling the read commands. In one embodiment, the read commands correspond to reads made by the memory controller 102 control data such as L2P tables or the like stored on a memory die. The twelve read commands (r1-r12)

include seven random reads (r1, r2, r4, r5, r7, r9, HO) and five sequential reads (r3, r6, r8, r11, and r12). The length of each command in kilobytes (KB) is listed with each command. The random reads are each 4 KB in this example but they could be some other size. The sequential reads vary between 40 KB and 64 KB in this example. Each sequential read could be a single read command. However, multiple read commands that are to consecutive addresses (e.g., consecutive LBAs) are what are referred to herein as a sequential read command stream. Any of the sequential reads (r3, r6, r8, r11, and r12) depicted in FIG. 7 could be a sequential read command stream that includes more than one read command. The read commands that are part of a sequential read command stream are referred to herein as sequential commands regardless of their individual length.

Figure 8:
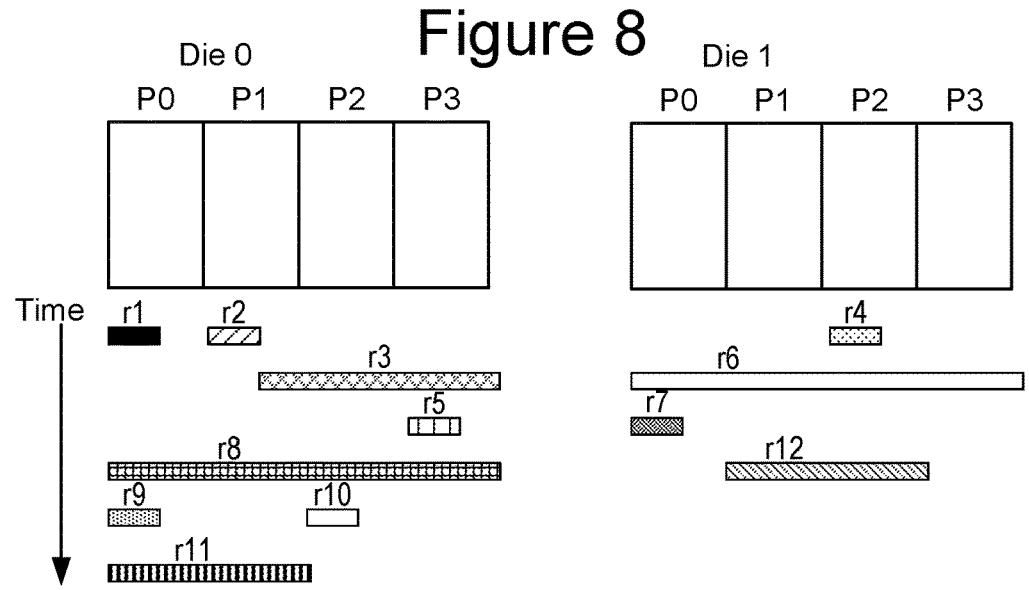
FIG. 8 depicts an example in which the memory system alternates between an AIPR mode and a non-AIPR mode.
Figure 9:
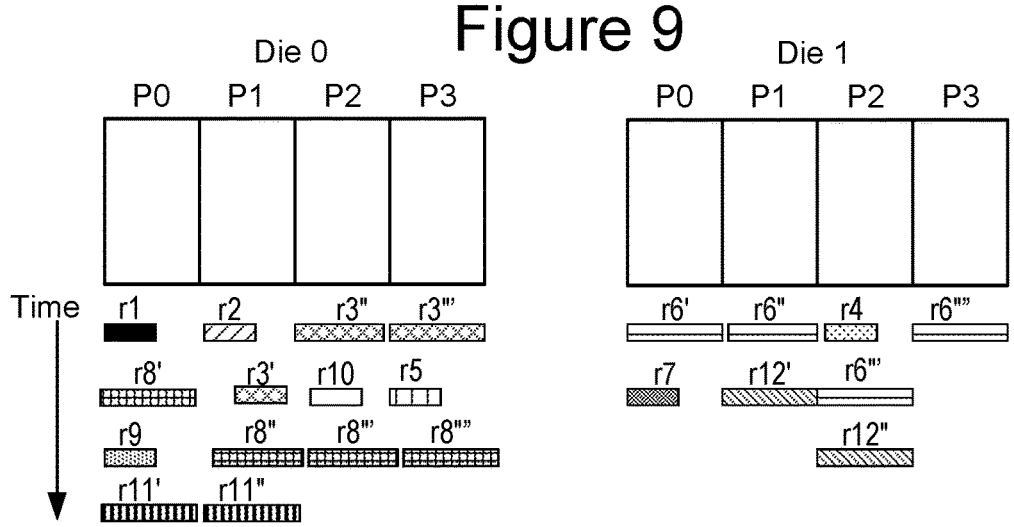
FIG. 9 depicts an embodiment in which sequential reads are divided into reads at plane boundaries and submitted to the planes as AIPR reads on par with the random reads.

FIG. 8 and FIG. 9 depict two ways in which the read commands of FIG. 7 can be submitted to the four planes (P0, P1, P2, P3) on each of two memory dies (Die 0, Die 1). In FIGS. 8 and 9 the page size for a read in one plane is 16 KB. However, the page could be larger or smaller. FIG. 8 depicts an example in which the memory system alternates between an AIPR mode in which only random reads are submitted to the planes and a non-AIPR mode in which sequential reads are submitted to the planes as multi-plane parallel reads. FIG. 9 depicts an embodiment in which sequential reads are divided into reads at plane boundaries and submitted to the planes as AIPR reads on par with the random reads. The plane boundaries are defined by physical addresses in the storage system 100. The embodiment depicted in FIG. 9 can improve performance.

Referring now to FIG. 8 initially the memory system is in the AIPR mode in which only random reads are submitted to the planes. Random read r1 is submitted to P0/Die0, random read r2 is submitted to P1/Die0, and random read r4 is submitted to P2/Die1. These reads can be submitted asynchronously. However, note that five of the planes may be idle during this time frame. Note that when, for example, random read r1 is executed in P0 that a page of 16 KB memory cells could be read. However, only the pertinent 4 KB of data is returned to the host 120.

Next, the storage system 100 switches to the non-AIPR mode in which a sequential read may be submitted to the planes as multi-plane parallel reads. Note that switching to the non-AIPR mode may result in memory controller 102 overhead, thereby impacting performance. Sequential read r3 is submitted to P1/Die0, P2/Die0, and P2/Die0. Also, sequential read r6 is submitted to P0/Die1, P1/Die1, P2/Die1, and P2/Die1. Next, the storage system 100 switches back to the AIPR mode and submits random read r5 to P3/Die0 and random read r7 to P0/Die1. Then, the storage system 100 switches back to the non-AIPR mode and submits sequential read commands r8 and r12. Then, the memory system switches back to the AIPR mode and submits random reads r9 and r10. Finally, the storage system 100 switches back to the non-AIPR mode and submits sequential read command r11 to P0/Die0 and P1/Die0.

FIG. 9 depicts an embodiment that improves performance relative to the example in FIG. 8. The storage system 100 is in a mode in which sequential read commands may be split at plane boundaries and submitted as asynchronous independent plane reads on par with random reads. By submitting the sequential and random reads on par a portion of the sequential read stream can execute on one plane at the same time as a random read on another plane. Initially the storage system 100 submits random reads r1, r2, and r4 similar to the example of FIG. 8. However, in addition, sequential read r3 is divided at plane boundaries into plane read commands r3', r3", and r3"'. Each plane read command is to read data stored within one plane. When a plane read command is executed on a plane, a page (e.g., 16 KB) of memory cells in that plane may be read. Recall that sequential read r3 is a 40 KB read. This may divide into an 8 KB read in P1/Die (r3'), a 16 KB read in P2/Die (r3"), and a 16 KB read in P3/Die (r3"'). These three plane read commands will be submitted as three separate asynchronous independent plane reads. Because P1/Die0 is busy with r2, r3' will not be submitted to P1 until random read command r2 is done. However, as P2/Die0 and P3/Die0 are free r3" and r3"' may be submitted to P2/Die0 and P3/Die0, respectively. Also r6 is split at plane boundaries into plane read commands r6', r6", r6"', and r6"". Because P2/Die1 is busy with random read r4, the memory controller 102 will wait to submit r6"' to P2/Die1. However, as the other planes of Die1 are free, the memory controller 102 submits r6', r6", and r6"" to P0/Die1, P1/Die1, and P3/Die1, respectively.

As planes become free, the memory controller 102 will submit additional read commands as independent asynchronous read requests. For example, sequential read r8 is divided at plane boundaries into plane read commands r8', r8", r8"', and r8"". Read commands r8', r8", r8"', and r8"" are submitted to the planes of Die 0 as independent asynchronous read requests as those planes become free. In the example of FIG. 8, read commands r3', r10 and r5 will be submitted to their respective planes prior to read commands r8", r8"', and r8"". Also note that read commands r8", r8"', and r8"" are not required to be submitted to their respective planes at the same time. Rather, read commands r8", r8"', and r8"" may be submitted to their respective planes as soon as the previous read command in the respective plane has completed.

Sequential read r11 is divided at plane boundaries into plane read commands r11' and r11". Read commands r11' and r11" are submitted as independent asynchronous read requests to P0/Die0 and P1/Die0 respectively when those planes are free. Sequential read r12 is divided at plane boundaries into plane read commands r12' and r12". Read commands r12' and r12" are submitted as independent asynchronous read requests to P1/Die1 and P2/Die1 respectively when those planes are free. Note that in the example in FIG. 9, frequently all four planes of each die is in use at all times. Also note that as soon as a read command is done in a plane, the next read command may be submitted without having to wait for a read command in another plane to finish. Furthermore note that in this example there was no need to switch modes such as was done in the example in FIG. 8. Therefore, an embodiment of splitting sequential read commands and submitting them as asynchronous independent plane reads on par with random reads has high performance.

Figure 10:
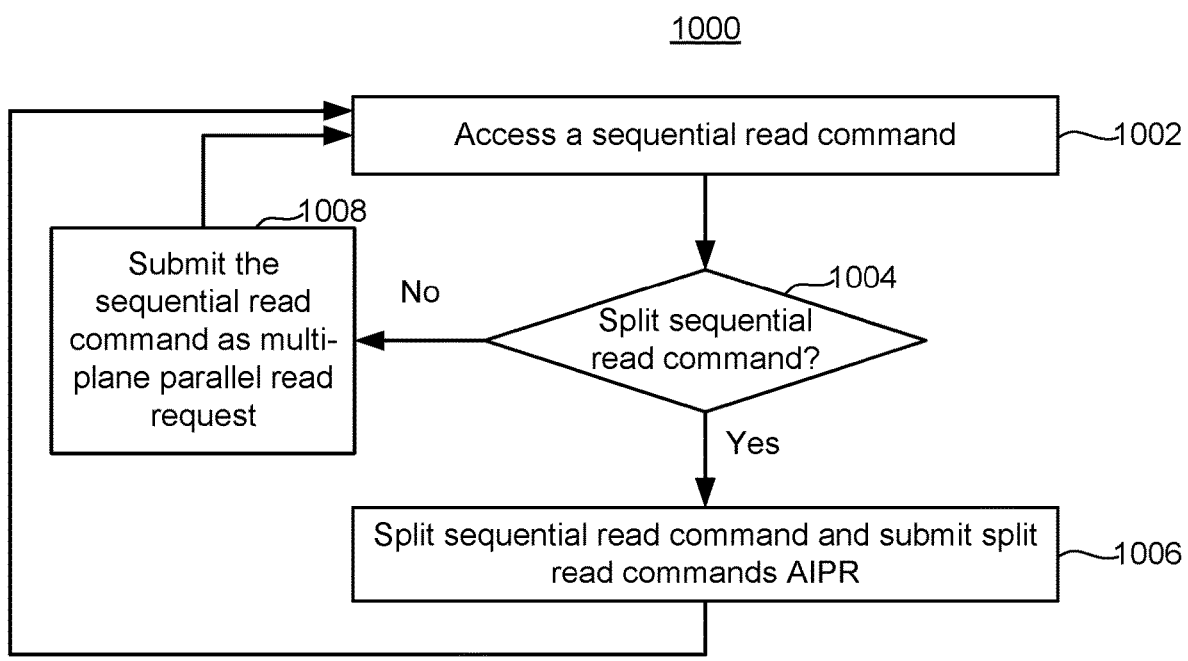
FIG. 10 is a flowchart of one embodiment of a process of submitted read commands to memory dies in a non-volatile storage system.

FIG. 10 is a flowchart of one embodiment of a process 1000 of submitting read commands to memory dies in a non-volatile storage system 100. The process 1000 may be performed by, at least in part, by memory controller 102. In one embodiment, process 1000 is performed within BEP 112 of the memory controller 102. The process 1000 provides further details for one embodiment of steps 606 and 608 in process 600. Thus, the memory controller 102 may perform logical address to physical address translation prior to process 600. The process 1000 includes two modes. One mode allows sequential read commands to be split at plane boundaries and submitted to planes as asynchronous independent plane reads. Random reads may be submitted to the planes on par with the split sequential read commands. However, it may not be efficient to operate in this mode 100 percent of the time. Thus, there may be a second mode in which the sequential read commands are submitted as multi-plane parallel read commands.

Step 1002 includes accessing a sequential read command. As noted above, the memory controller 102 may receive the sequential read command by way of host interface 150 from the host 120. In one embodiment, the memory controller 102 forms the read command to read control data such as, for example, an L2P table stored on a memory die. Step 1002 may include the read command being provided to the BEP 112.

Step 1004 includes a determination of whether to split the sequential read command. The decision to split may be made based on which of the aforementioned modes is in force. In an embodiment, the memory controller 102 will base this decision on the mix of sequential reads to random reads over some period of time. For example, if the mix has a relatively low ratio of sequential reads to random reads, the mode in which sequential read commands are split may be enforced. On the other hand, in an embodiment, if the mix has a relatively high ratio of sequential reads to random reads, the mode in which sequential read commands are split is not enforced. In an embodiment, if the mix has a relatively high ratio of sequential reads to random reads then the sequential reads may be submitted as multi-plane parallel read commands. Other techniques may be used to determine which mode to enforce. In one embodiment, the determination of whether to split the sequential commands is based on the whether the logical address of the read command is within a certain range of logical addresses. Thus, the host's logical address space could have a range for which splitting the sequential commands is permitted and a range for which splitting the sequential commands is not permitted. In one embodiment, the FEP 110 determines whether to split the sequential read command. In one embodiment, the BEP 112 determines whether to split the sequential read command.

If the splitting mode is in force, then in step 1006 the sequential read command is split at plane boundaries into separate plane reads. The separate plane reads are then submitted to the respective planes as asynchronous independent plane reads. FIG. 9 depicts an example in which sequential read commands r3, r6, r8, r12, and r13 are split at plane boundaries into separate plane reads. Also, those commands are then submitted to the respective planes as asynchronous independent plane reads. In one embodiment, step 1006 is performed by interface 228/258 (see FIG. 1C).

If the splitting mode is not in force, then in step 1008 the sequential read command is submitted as a multi-plane parallel read. FIG. 8 depicts an example in which sequential read commands r3, r6, r8, r12, and r13 are submitted as respective multi-plane parallel reads. In one embodiment, step 1008 is performed by interface 228/258 (see FIG. 1C).

Figure 11:
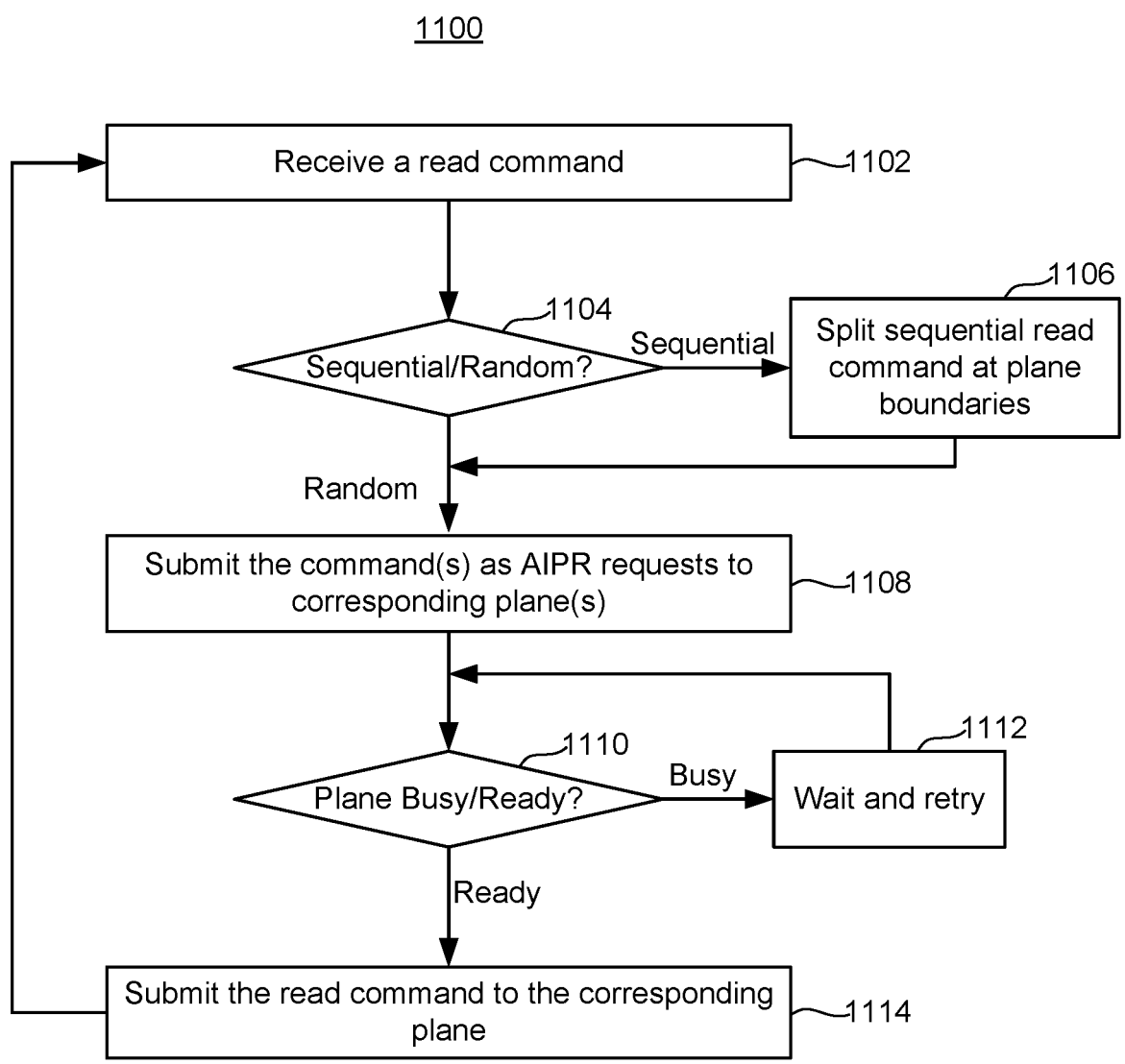
FIG. 11 is a flowchart of one embodiment of a process in which both random reads and sequential reads are submitted to planes as asynchronous independent plane reads.

FIG. 11 is a flowchart of one embodiment of a process 1100 in which both random reads and sequential reads are submitted to planes as asynchronous independent plane reads. In one embodiment, process 1100 is performed by the memory controller 102. The process 1100 provides further details for one embodiment of steps 1002-1006 of process 1000 in which the determination in step 1004 is to split the sequential read command. Step 1102 includes receiving a read command. The read command could be a random read or a sequential read. As noted above, the memory controller 102 may receive the read command by way of host interface 150 from the host 120. The FEP 110 may perform logical address to physical address translation and forward the read command to the BEP 112. In one embodiment, the memory controller 102 forms the read command to read control data such as, for example, an L2P table on a memory die.

Step 1104 includes a determination of whether the read command is random or sequential. In one embodiment, the determination is based on whether this read command is part of a sequential read command stream. As noted above, a "sequential read command stream" is a collection of one or more read commands that is collectively directed to a consecutive range of addresses having a certain minimum length. One convenient way to define the sequential read command stream is based on the logical addresses in the host's address space, although the sequential read command stream could alternatively be defined based on the storage system's physical address space. As one example, the certain minimum length could be a logical block, which could have a length of 4 KB. A read command that is not part of a sequential read command stream is a random read command. For example, a random read could be defined as one having a data length of 4 KB or less, providing the read command is not part of a sequential command stream. Further details of detection of sequential read command streams is described in U.S. Pat. No. 9,977,623 entitled "Detection of a Sequential Command Stream" to Jean et al., which is hereby incorporated by reference. However, detection of sequential read command streams is not limited techniques described in U.S. Pat. No. 9,977,623.

If the read command is sequential, then step 1106 is performed. Step 1106 may include splitting the sequential read command at plane boundaries. The sequential read command may be split into multiple plane read commands with each plane read command being a command to read data in a single plane. The plane read command is not required to read data across the entire width of the plane. For example, referring back to FIG. 9, plane read commands r3" and r3'" read data across the entire width (e.g., page of memory cells) of their respective planes (P2, P3), but plane read command r3' reads data across only a portion it its plane P1. In one embodiment, it is possible that a sequential read command is not split. This may be the case if the sequential read command is for data that can be read entirely within one plane. For example, the plane could be 16 KB with the sequential read commands being 16 KB that can be read in a single plane.

If the read command is random, then step 1106 is not performed. Step 1108 includes submitting the read command(s) as AIPR requests to the corresponding planes. In the event that step 1106 was performed the various plane read commands are submitted to the corresponding planes as AIPR requests. In the event that step 1106 was not performed the random read command is submitted to its corresponding plane as an AIPR request. By submitting the command(s) as AIPR requests, the memory controller 102 may wait to send the read command to a die until the plane is ready for a new read command. Thus, in an embodiment, step 1108 does not constitute sending the read command to the die having the plane to be read. In one embodiment, step 1108 is performed by a scheduler in the interface 228/258 in the BEP 112.

Step 1110 may then be performed for each read command that was submitted to a plane. In step 1110, a determination is made whether the plane is busy or ready. If the plane is busy then the memory controller 102 waits and retries the submission (step 1112). In one embodiment, the memory controller 102 employs an aging algorithm to prevent starvation of the read command. For example, if a command is not submitted to the memory die after five iterations, then the read command will be submitted ahead of another command that is scheduled for that plane.

When the plane is read, the read command is submitted to the plane in step 1114. Step 1114 may include the memory controller 102 sending a read command to one of the memory dies. The read command is an instruction to perform an asynchronous independent read of one of the planes on that die. In one embodiment, steps 1110-1114 are performed by a TM interface in the interface 228/258 in the BEP 112. The process 1100 then repeats for another read command that was received from the host 120.

FIG. 12 is a flowchart of one embodiment of a process 1200 of submitting read commands when sequential read commands are submitted as multi-plane parallel reads. In one embodiment, process 1100 is performed by BEP 112 in the memory controller 102. Process 1200 provides further details of one embodiment of steps 1002, 1004, 1008 of process 1000 in which the determination in step 1004 is to not split the sequential read command. Step 1202 includes receiving a read command. The read command could be a random read or a sequential read. In an embodiment, the memory controller 102 receives the read command by way of host interface 150 from the host 120. The FEP 110 may perform logical address to physical address translation and provide the read command to the BEP 112. In an embodiment, the memory controller 102 generates the read command to read control information such as L2P tables stored on a memory die. Step 1204 is a determination of whether the read command is random or sequential, an example of which has been discussed in connection with step 1104 in process 1100.

In the command is sequential then step 1206 is performed. Step 1206 includes submitting the sequential read command as a multi-plane parallel read command to corresponding planes. Step 1206 may include the memory controller 102 sending a read command to a die that instructs the die to perform the multi-plane parallel read command. In one embodiment, step 1206 is performed by interface 228/258 in the BEP 112.

In the command is random then step 1208 is performed. Step 1208 includes submitting the random read command as an asynchronous independent read. Step 1208 may include the memory controller 102 sending a read command to a die that instructs the die to perform the asynchronous independent read in one of the planes of that die. In one embodiment, step 1208 is performed by interface 228/258 in the BEP 112.

Figure 13A:
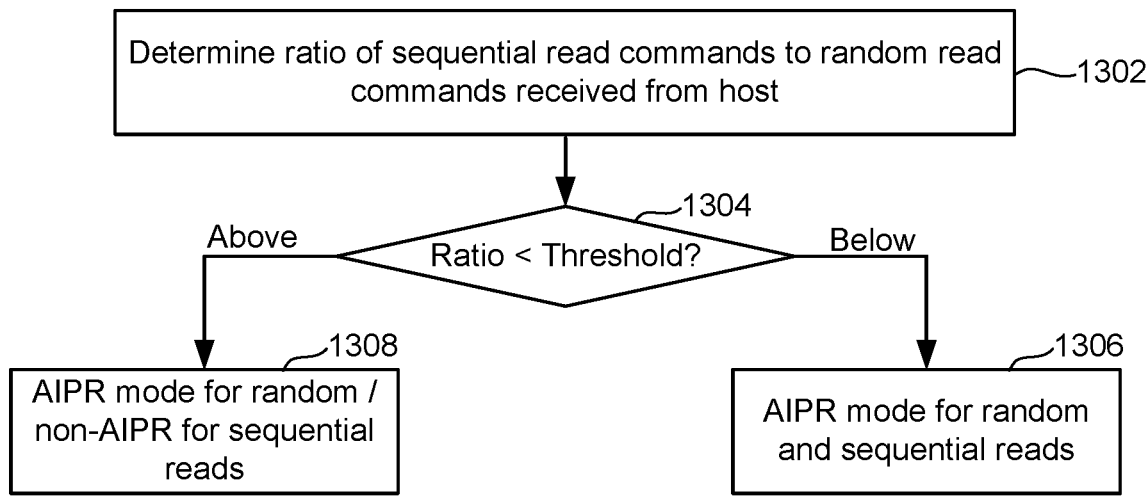
FIGS. 13A and 13B are flowcharts that depict embodiments of determining whether to split sequential read commands.
Figure 13B:
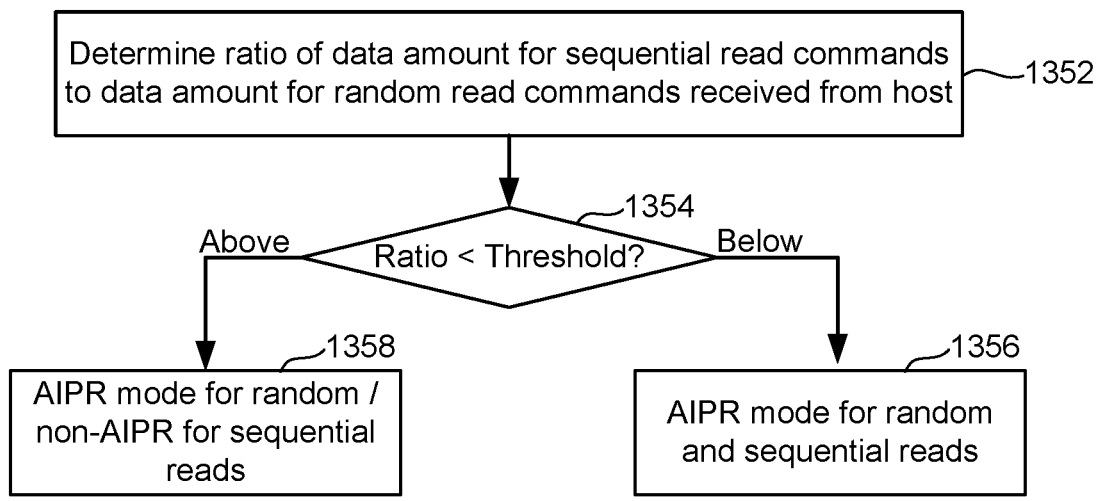

FIGS. 13A and 13B are flowcharts that depict further details of embodiments of determining whether to split sequential read commands as has been described herein. FIG. 13A is a flowchart of one embodiment of a process 1300 of determining whether to split sequential read commands based on a ratio of sequential read commands to random commands. The process 1300 may be performed in one embodiment of step 1004 of process 1000. In one embodiment, process 1300 is performed by FEP 110 of the memory controller 102. In one embodiment, process 1300 is performed by BEP 112 of the memory controller 102. Step 1302 of FIG. 13A includes determining a ratio of sequential read commands to random read commands received by the memory controller 102 from the host 120. The ratio may be for commands received over some period of time such as, for example, those commands presently on one or more command queues.

If the ratio is below a threshold (step 1304 result is below), then in step 1306 the storage system 100 operates in a mode in which AIPR is used for both random and sequential reads. In this mode, the sequential read commands may be split at plane boundaries into multiple plane read commands. The process 1100 of FIG. 11 may be performed in this mode of step 1306.

If the ratio is above the threshold (step 1304 result is above), then in step 1308 the storage system 100 operates in a mode in which AIPR is used for random and but not for sequential reads. In this mode, the sequential read commands are not split at plane boundaries, but are submitted as multi-plane parallel reads. The process 1200 of FIG. 12 may be performed in this mode of step 1308.

FIG. 13B is a flowchart of one embodiment of a process 1350 of determining whether to split sequential read commands based on a ratio of the data to be read for sequential read commands to the data to be read for random commands. The process 1350 may be performed in one embodiment of step 1004 of process 1000. In one embodiment, process 1350 is performed by FEP 110 of the memory controller 102. In one embodiment, process 1350 is performed by BEP 112 of the memory controller 102. Step 1352 of FIG. 13B includes determining a ratio of the data to be read for sequential read commands to the data to be read for random read commands received by the memory controller 102 from the host 120. The ratio may be for commands received over some period of time.

If the ratio is below a threshold (step 1354 result is below), then in step 1356 the storage system 100 operates in a mode in which AIPR is used for both random and sequential reads. In this mode, the sequential read commands may be split at plane boundaries into multiple plane read commands. The process 1100 of FIG. 11 may be performed in this mode of step 1356.

If the ratio is above the threshold, then in step 1358 the storage system 100 operates in a mode in which AIPR is used for random reads but not for sequential reads. In this mode, the sequential read commands are not split at plane boundaries, but are submitted as multi-plane parallel reads. The process 1200 of FIG. 12 may be performed in this mode of step 1358.

Step 1302 in process 1300 and step 1352 in process 1350 describe different embodiments of determining whether a ratio with respect to the sequential read commands received over the communication interface to the random read commands received over the communication interface exceeds (or alternatively is below) a threshold. Thus, steps 1302 and 1352 may be generalized as just stated. Also, the thresholds in steps 1304 and 1354 may be established based on factors such as the application. For example, a video application may have a different threshold than a database application.

In view of the foregoing, a first embodiment includes an apparatus comprising a communication interface configured to communicate with a host and one or more control circuits in communication with the communication interface. The one or more control circuits are configured to connect to one or more memory packages. Each memory package has a plurality of planes of non-volatile memory cells. The one or more control circuits are configured to access sequential read commands. The one or more control circuits are configured to form a plurality of plane read commands from one more of the sequential read commands. Each plane read command is for data stored in a single plane of the plurality of planes. The one or more control circuits are configured to submit the plurality of plane read commands as asynchronous independent plane read (AIPR) commands to the respective planes.

In a second embodiment, in furtherance to the first embodiment, the sequential read commands are received over the communication interface from the host. The one or more control circuits are further configured to receive random read commands over the communication interface from the host. The one or more control circuits are further configured to submit one or more of the random read commands as asynchronous independent plane read commands to one or more planes on par with the submission of the plurality of plane read commands.

In a third embodiment, in furtherance to the second embodiment, the one or more control circuits are further configured to determine whether a ratio with respect to the sequential read commands received over the communication interface to the random read commands received over the communication interface is below a threshold. The one or more control circuits are further configured to form the plurality of plane read commands from the one more of the sequential read commands responsive to a determination that a ratio of the sequential read commands to the random read commands is below a threshold. The one or more control circuits are further configured to submit at least one of the sequential read commands received over the communication interface from the host to one or more of the memory dies as a multi-plane parallel read responsive to a determination that the ratio of the sequential read commands to the random read commands exceeds the threshold.

In a fourth embodiment, in furtherance to the third embodiment, the ratio is based on a first number of the sequential read commands to a second number of the random read commands.

In a fifth embodiment, in furtherance any of the second to fourth embodiments, the random read commands are each for data stored in a single plane of the plurality of planes. Each sequential read command is part of a sequential read command stream of one or more read commands.

In a sixth embodiment, in furtherance of any of the first to fifth embodiments, the one or more control circuits are configured to form the sequential read commands to access control data stored in the one or more memory packages.

In a seventh embodiment, in furtherance any of the first to sixth embodiments, the one or more control circuits are further configured to determine whether a target plane is available to accept a new plane read command; wait for a first target plane to become available prior to submitting a first plane read command of the plurality of plane read commands responsive to a determination that the first target plane is not presently available to accept a new plane read command; and submit the first plane read command to the first target plane responsive to a determination that the first target plane is presently available to accept a new plane read command.

In an eighth embodiment, in furtherance to any of the first to seventh embodiments, the one or more control circuits are further configured to apply aging techniques to avoid starvation of plane read commands responsive to a determination that the first target plane is not presently available to accept a new plane read command.

In a ninth embodiment, in furtherance to any of the first to the eighth embodiments, the one or more control circuits are further configured to translate logical addresses specified in the sequential read commands to physical addresses, the logical addresses being in an address space of the host, the physical addresses being in a physical address space of the one or more memory dies. The one or more control circuits are further configured to determine whether read commands from the host are sequential or random based on the logical addresses. The one or more control circuits are further configured to form the plurality of plane read commands from the one more of the sequential read commands based on plane boundaries defined by the physical addresses.

In a tenth embodiment, in furtherance to any of the first to ninth embodiments, the one or more memory packages each comprise a plurality of memory dies. Each memory die comprises multiple planes of the plurality of planes.

In an eleventh embodiment, in furtherance to any of the first to ninth embodiments, the one or more memory packages each comprise a plurality of integrated memory assemblies. Each integrated memory assembly comprises at least one control die connected to one or more memory die. Each memory die comprises multiple planes of the plurality of planes.

One embodiment includes a method for reading data in a non-volatile storage system. The method comprises receiving a mix of random read commands and sequential read commands from a host. The random read commands are each for data stored in a single plane in the non-volatile storage system. The sequential read commands include read commands that are part of sequential read command streams that span more than one planes in the non-volatile storage system. The method comprises breaking the sequential read command streams at plane boundaries into a plurality of plane read commands. Each plane read command is for data within a single plane. The method comprises submitting the plurality of the plane read commands to respective planes in the non-volatile storage system with a plurality of the random read commands as asynchronous independent plane read commands to respective planes in the non-volatile storage system.

One embodiment includes a non-volatile storage system comprising a plurality of planes of NAND memory cells and a communication interface configured to receive read commands from a host. The read commands include random read commands and sequential read commands. The random read commands are each for data stored in a single plane. Each sequential read command is part of a sequential read command stream for data stored in more than one plane. The non-volatile storage system includes means for determining whether to submit the sequential read commands to respective planes as asynchronous independent plane read commands or as multi-plane parallel read commands. The non-volatile storage system includes means for submitting the sequential read commands on par with the random read commands to respective planes as asynchronous independent plane read commands responsive to a determination to submit the sequential read commands as asynchronous independent plane read commands. The non-volatile storage system includes means for submitting the sequential read commands of a sequential read command stream as a multi-plane parallel read command separate from submitting the random read commands as asynchronous independent plane read commands responsive to a determination to submit the sequential read commands as multi-plane parallel read commands.

In embodiments, the means for determining whether to submit the sequential read commands to respective planes as asynchronous independent plane read commands or as multi-plane parallel read command comprises one or more of memory controller 102, FEP 110, BEP 112, a processor, an FPGA, an ASIC, and/or an integrated circuit. In embodiments, the means for determining whether to submit the sequential read commands to respective planes as asynchronous independent plane read commands or as multi-plane parallel read command performs one or more of process 1300 and/or process 1350.

In embodiments, the means for submitting the sequential read commands on par with the random read commands to respective planes as asynchronous independent plane read commands responsive to a determination to submit the sequential read commands as asynchronous independent plane read commands comprises one or more of memory controller 102, FEP 110, BEP 112, data path controller 222/252, interface 228/258, a processor, an FPGA, an ASIC, and/or an integrated circuit. In embodiments, the means for submitting the sequential read commands on par with the random read commands to respective planes as asynchronous independent plane read commands responsive to a determination to submit the sequential read commands as asynchronous independent plane read commands performs process 1100.

In embodiments, the means for submitting the sequential read commands of a sequential read command stream as a multi-plane parallel read command separate from submitting the random read commands as asynchronous independent plane read commands responsive to a determination to submit the sequential read commands as multi-plane parallel read commands comprises one or more of memory controller 102, FEP 110, BEP 112, data path controller 222/252, interface 228/258, a processor, an FPGA, an ASIC, and/or an integrated circuit. In embodiments, the means for submitting the sequential read commands of a sequential read command stream as a multi-plane parallel read command separate from submitting the random read commands as asynchronous independent plane read commands responsive to a determination to submit the sequential read commands as multi-plane parallel read commands performs process 1200.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
   a communication interface configured to communicate with a host; and
   one or more control circuits in communication with the communication interface and configured to connect to one or more memory packages, each memory package having a plurality of planes of non-volatile memory cells, wherein the one or more control circuits are configured to:
   access sequential read commands;
   form a plurality of plane read commands from one or more of the sequential read commands, wherein each formed plane read command of the plurality of formed plane read commands is for data stored in a single plane of the plurality of planes; and
   submit the plurality of formed plane read commands as asynchronous independent plane read (AIPR) commands to respective planes of the plurality of planes when the respective planes are free.

2. The apparatus of claim 1, wherein:
   the sequential read commands are received over the communication interface from the host; and
   the one or more control circuits are further configured to:
   receive random read commands over the communication interface from the host; and
   submit one or more of the random read commands as asynchronous independent plane read commands to one or more planes on par with the submission of one or more plane read commands of the plurality of formed plane read commands.

3. The apparatus of claim 2, wherein the one or more control circuits are further configured to:
   determine whether a ratio with respect to the sequential read commands received over the communication interface to the random read commands received over the communication interface is below a threshold;
   form the plurality of plane read commands from the one more of the sequential read commands responsive to a determination that a ratio of the sequential read commands to the random read commands is below the threshold; and
   submit at least one of the sequential read commands received over the communication interface from the host to one or more of the memory dies as a multi-plane parallel read responsive to a determination that the ratio of the sequential read commands to the random read commands exceeds the threshold.

4. The apparatus of claim 3, wherein the ratio is based on a first number of the sequential read commands to a second number of the random read commands.

5. The apparatus of claim 2, wherein:
   the random read commands are each for data stored in a single plane of the plurality of planes; and
   each sequential read command is part of a sequential read command stream of one or more read commands.

6. The apparatus of claim 1, wherein the one or more control circuits are configured to form the sequential read commands to access control data stored in the one or more memory packages.

7. The apparatus of claim 1, wherein the one or more control circuits are further configured to:
   determine whether a target plane is available to accept a new plane read command;
   wait for a first target plane to become available prior to submitting a first plane read command of the plurality of formed plane read commands responsive to a determination that the first target plane is not presently available to accept a new plane read command; and submit the first plane read command to the first target plane responsive to a determination that the first target plane is presently available to accept a new plane read command.

8. The apparatus of claim 7, wherein the one or more control circuits are further configured to:

apply aging techniques to avoid starvation of plane read commands responsive to a determination that the first target plane is not presently available to accept a new plane read command.

9. The apparatus of claim 1, wherein the one or more control circuits are further configured to:

translate logical addresses specified in the sequential read commands to physical addresses, the logical addresses being in an address space of the host, the physical addresses being in a physical address space of the one or more memory dies;

determine whether read commands from the host are sequential or random based on the logical addresses; and form the plurality of plane read commands from the one more of the sequential read commands based on plane boundaries defined by the physical addresses.

10. The apparatus of claim 1, wherein:

the one or more memory packages each comprise a plurality of memory dies; and each memory die comprises multiple planes of the plurality of planes.

11. The apparatus of claim 1, wherein:

the one or more memory packages each comprise a plurality of integrated memory assemblies; and each integrated memory assembly comprises at least one control die connected to one or more memory die, each memory die comprises multiple planes of the plurality of planes.

12. A method for reading data in a non-volatile storage system, the method comprising:

receiving a mix of random read commands and sequential read commands from a host, wherein the random read commands are each for data stored in a single plane in the non-volatile storage system, wherein the sequential read commands include read commands that are part of sequential read command streams that each span multiple planes in the non-volatile storage system;

breaking the sequential read command streams at plane boundaries into a plurality of plane read commands in which each plane read command is for data within a single plane; and submitting a first set of plane read commands of the plurality of the plane read commands and a second set of random read commands of the random read commands received from the host as asynchronous independent plane read commands to respective planes in the non-volatile storage system.

13. The method of claim 12, further comprising:

determining whether a present ratio pertaining to the sequential read commands to the random read commands from the host is below a threshold; and submitting sequential read commands as multi-plane parallel read commands responsive to the ratio not exceeding the threshold, wherein breaking the sequential read command streams at plane boundaries into a plurality of plane read commands and submitting the first set of plane read commands of the plurality of the plane read commands to respective planes as asynchronous independent plane read commands is performed responsive to the ratio being below the threshold.

14. The method of claim 12, further comprising:

executing a first random read command of the second set of random read commands on a first plane while executing a first plane read command of the first set of plane read commands on a second plane.

15. A non-volatile storage system comprising:

a plurality of planes of NAND memory cells;

a communication interface configured to receive read commands from a host, wherein the read commands include random read commands and sequential read commands, wherein the random read commands are each for data stored in a single plane, wherein the sequential read commands include read commands that are part of a plurality of sequential read command streams that each are for data stored in more than one plane of the plurality of planes;

means for submitting first asynchronous independent plane read (AIPR) commands formed from a first sequential read command stream of the plurality of sequential read command streams on par with second AIPR commands formed from the random read commands to respective planes responsive to a determination to submit the first sequential read command stream as asynchronous independent plane read commands; and means for submitting a multi-plane parallel read command formed from a second sequential read command stream of the plurality of sequential read command streams in an operation separate from submitting the random read commands as AIPR commands responsive to a determination to submit the second sequential read command stream as the multi-plane parallel read command.

16. The non-volatile storage system of claim 15, wherein the means for submitting the first AIPR commands on par with the second AIPR commands is configured to:

form a plurality of plane read commands from the first sequential read command stream, wherein each of the plane read commands is for data stored in a single plane.

17. The non-volatile storage system of claim 16, wherein the means for submitting the first AIPR commands formed on par with the second AIPR commands is configured to:

submit a first plane read command to a first plane while a first random read command is executing in a second plane.

18. The non-volatile storage system of claim 16, wherein the means for submitting the first AIPR commands on par with the second AIPR commands is configured to:

submit a first random read command to a first plane while a first plane read command is executing in a second plane.

19. The non-volatile storage system of claim 15, further comprising means for determining whether to submit the sequential read commands to respective planes as asynchronous independent plane read commands or as multi-plane parallel read commands based on whether a ratio with respect to the sequential read commands received over the communication interface to the random read commands received over the communication interface is below a threshold.

20. The non-volatile storage system of claim 15, wherein the means for submitting the first AIPR commands formed on par with the second AIPR commands is configured to:

operate in a first mode in which only random read commands are submitted as the asynchronous independent plane read commands; and operate in a second mode in which sequential read commands are submitted as multi-plane parallel read commands.

* * * * *